US 9,485,341 B2

(12) United States Patent
Park et al.

(10) Patent No.: US 9,485,341 B2
(45) Date of Patent: Nov. 1, 2016

(54) TERMINAL DEVICE AND METHOD FOR CONTROLLING THE SAME

(71) Applicant: LG ELECTRONICS INC., Seoul (KR)

(72) Inventors: Sihwa Park, Seoul (KR); Doyoung Lee, Seoul (KR); Sinae Chun, Seoul (KR); Jongho Kim, Seoul (KR); Juhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/619,816

(22) Filed: Feb. 11, 2015

(65) Prior Publication Data
US 2016/0191690 A1 Jun. 30, 2016

(30) Foreign Application Priority Data
Dec. 29, 2014 (KR) .................. 10-2014-0191910

(51) Int. Cl.
| H04M 1/00 | (2006.01) |
| H04M 1/725 | (2006.01) |
| G06F 3/147 | (2006.01) |
| G06F 1/16 | (2006.01) |
| G06K 9/00 | (2006.01) |
| H04M 1/02 | (2006.01) |

(Continued)

(52) U.S. Cl.
CPC ........ *H04M 1/72519* (2013.01); *G06F 1/1613* (2013.01); *G06F 1/1652* (2013.01); *G06F 3/147* (2013.01); *G06F 17/2765* (2013.01); *G06K 9/00087* (2013.01); *H04M 1/0264* (2013.01); *H04M 1/0268* (2013.01); *H04M 1/66* (2013.01)

(58) Field of Classification Search
CPC .............................................. H04M 1/72519
USPC ............................................ 455/575.1, 90.3
See application file for complete search history.

(56) References Cited

U.S. PATENT DOCUMENTS 6,873,315 B2 * 3/2005 Hemia .................. G06F 1/1615
345/156
7,109,967 B2 9/2006 Hioki et al.
(Continued)

FOREIGN PATENT DOCUMENTS

| EP | 2309710 A1 | 4/2011 |
| KR | 10-2014-0136356 A | 11/2014 |
| KR | 10-2014-0145480 A | 12/2014 |

*Primary Examiner* — Sanh Phu
(74) *Attorney, Agent, or Firm* — Birch, Stewart, Kolasch & Birch, LLP

(57) ABSTRACT

A terminal device and a method for controlling the same are disclosed herein. The terminal device includes a communication unit configured to perform communication with an external target, a rollable display unit configured to be stored in the housing and to be exposed from the housing, a sub display unit configured to be positioned on a portion of the housing, a grip unit configured to be positioned on a lower portion of the housing and to detect whether or not a contact is being made, a sensor unit configured to detect a movement of the terminal device, an input unit configured to receive commands from an external source, and a controller, wherein the controller may be configured to set up a first mode, in case the rollable display unit is exposed from the housing, wherein at least one key of the input unit is mapped to a key configured to perform a function respective to the first mode, and to set up a second mode, in case the rollable display unit is stored in the housing, and in case a contact state detected by the grip unit matches with a predetermined contact state, wherein at least one key of the input unit is mapped to a key configured to perform a function respective to the second mode.

19 Claims, 18 Drawing Sheets

(51) Int. Cl.
  *H04M 1/66* (2006.01)
  *G06F 17/27* (2006.01)

(56) References Cited

U.S. PATENT DOCUMENTS

| | | |
|---|---|---|
| 7,443,380 B2 | 10/2008 | Nozawa |
| 7,880,718 B2 | 2/2011 | Cradick et al. |
| 8,515,487 B2 | 8/2013 | Park et al. |
| 8,587,539 B2 | 11/2013 | Tziortzis et al. |
| 2004/0008191 A1 | 1/2004 | Poupyrev et al. |
| 2008/0303782 A1 | 12/2008 | Grant et al. |
| 2009/0219247 A1 | 9/2009 | Watanabe et al. |
| 2010/0011291 A1 | 1/2010 | Nurmi |
| 2010/0117975 A1 | 5/2010 | Cho |
| 2010/0141605 A1 | 6/2010 | Kang et al. |
| 2011/0057873 A1 | 3/2011 | Geissler et al. |
| 2012/0112994 A1 | 5/2012 | Vertegaal et al. |
| 2012/0169609 A1 | 7/2012 | Britton |
| 2013/0044240 A1 | 2/2013 | Leskela et al. |
| 2013/0127606 A1 | 5/2013 | Chang |
| 2013/0135182 A1 | 5/2013 | Jung et al. |
| 2013/0145311 A1 | 6/2013 | Joo |
| 2013/0201115 A1 | 8/2013 | Heubel |
| 2014/0002402 A1 | 1/2014 | Kang et al. |
| 2014/0035869 A1 | 2/2014 | Yun et al. |
| 2014/0062976 A1 | 3/2014 | Park et al. |
| 2014/0068473 A1 | 3/2014 | Jano et al. |
| 2014/0340339 A1 | 11/2014 | Jung et al. |
| 2014/0347326 A1 | 11/2014 | Yim et al. |

* cited by examiner (a)

(b)

(a)

(b)

(a)

(b)

(c)

(a)

(b)

(c)

(a)

(b)

(a)

(b)

(a)

(b)

(a)

(b)

(a)

(b)

(a)

(b)

TERMINAL DEVICE AND METHOD FOR CONTROLLING THE SAME

This application claims the benefit of the Korean Patent Application No. 10-2014-0191910, filed on Dec. 29, 2014, which is hereby incorporated by reference as if fully set forth herein.

BACKGROUND OF THE INVENTION

1. Field of the Invention

This specification relates to a terminal device and a method for controlling the same.

2. Discussion of the Related Art

Electronic devices that are currently being used include standardized display units. With the evolution in the electronic technology, electronic devices including diverse types of display units have recently been under development. For example, electronic devices including new types of display units, such as electronic devices including curved-type display units, electronic devices including transparent display units, electronic devices including flexible display units, and so on, are being developed.

However, the electronic device including the new type of display unit is merely configured to have its display unit changed while maintaining the same structure as the conventional (or legacy) electronic device. Accordingly, research and development of a new form of electronic device is also required to be carried out. Moreover, a convenient user interface that is available for usage in the newly developed electronic device is also required to be researched and developed.

SUMMARY OF THE INVENTION

Accordingly, the present specification is directed to terminal device and a method for controlling the same that substantially obviate one or more problems due to limitations and disadvantages of the related art.

An object of this specification is to provide terminal device and a method for controlling the same including a user interface that can be conveniently used by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an exemplary embodiment of this specification, a terminal device comprising a pillar-shaped housing may include a communication unit configured to perform communication with an external target, a rollable display unit configured to be stored in the housing and to be exposed from the housing, a sub display unit configured to be positioned on a portion of the housing, a grip unit configured to be positioned on a lower portion of the housing and to detect whether or not a contact is being made, a sensor unit configured to detect a movement of the terminal device, an input unit configured to receive commands from an external source, and a controller. And, herein, the controller may be configured to set up a first mode, in case the rollable display unit is exposed from the housing, wherein at least one key of the input unit is mapped to a key configured to perform a function respective to the first mode, and to set up a second mode, in case the rollable display unit is stored in the housing, and in case a contact state detected by the grip unit matches with a predetermined contact state, wherein at least one key of the input unit is mapped to a key configured to perform a function respective to the second mode.

Also, the housing may be configured of a first part and a second part both being detachable from one another along left-to-right directions based upon a major axis, and, in case the first part and the second part are detached from one another so as to be spread out, and the rollable display unit being stored in at least one of the first part and the second part may be exposed, and, in case the first part and the second part are reunited, the rollable display unit may be stored in at least one of the first part and the second part.

Meanwhile, the controller may map at least one key of the input unit to a Home key in the first mode, and the controller may map at least one key of the input unit to a Send key in the second mode.

Additionally, when an incoming call is received in the second mode, the controller may recognize a message based upon a signal detected by the sensor unit in accordance with a movement of the terminal device, and, when a Reject Call command is received, the controller may control the communication unit so as to transmit the recognized message to an opposite party.

Additionally, the controller may control the sub display unit so as to display the recognized message.

Additionally, when an incoming call is received in the second mode, and in case a lower end portion of the housing is contacted with an object for a predetermined period of time or more, the controller may activate a Speaker Phone function.

Additionally, the controller may recognize a message based upon a signal detected by the sensor unit in accordance with the movement of the terminal device, and the controller may execute a Recording mode configured to store the recognized message along with a call information.

Additionally, in case a Send command is received, the controller may control the communication unit so as to transmit the recognized message to the opposite party.

Additionally, when the Recording mode is being executed, and in case a lower end portion of the housing is contacted with an object for a predetermined period of time or more, the controller may stop the Recording mode.

Additionally, when a call is ended, and in case the rollable display unit is exposed from the housing, the controller may control the rollable display unit so as to display the recognized message along with the call information.

Meanwhile, the call information may include at least one of a call reception time, a phone call time, a sender, a recording time of the recognized message, and a voice-recording file of a phone call.

Meanwhile, the terminal device may further include a camera unit, and when an incoming call is received in the second mode, and in case the rollable display unit is exposed from the housing, the controller may activate a Video Phone function.

Additionally, in case the rollable display unit is stored in the housing, the controller may control the sub display unit so as to display an image of the opposite party.

Additionally, in case a contact state detected by the grip unit matches with a predetermined contact state, the controller may recognize a message based upon a signal detected by the sensor unit in accordance with a movement of the terminal device, and, in case a Send command is received, the controller may control the communication unit so as to transmit the recognized message to the opposite party.

Meanwhile, the grip unit may further include a fingerprint recognition sensor, and in case a fingerprint being inputted to the fingerprint recognition sensor matches with a predetermined fingerprint, the controller may cancel primary security settings.

Additionally, when the primary security settings are cancelled, in case a signature is recognized based upon a signal detected by the sensor unit in accordance with a movement of the terminal device, and in case the recognized signature matches with a predetermined signature, the controller may cancel secondary security settings.

Additionally, the controller may control the sub display unit so as to display the recognized signature for a predetermined period of time or more.

Additionally, the grip unit may further include a fingerprint recognition sensor, and when an authentication screen is displayed on the rollable display unit in the first mode, in case the rollable display unit is stored in the housing, and, in case a contact state detected by the grip unit matches with a predetermined contact state, the controller may set up a second mode, and in case a fingerprint inputted through the fingerprint recognition sensor matches with a predetermined fingerprint, and in case a signature is recognized based upon a signal detected by the sensor unit in accordance with a movement of the terminal device, and in case a recognized signature matches with a predetermined signature, the controller may execute authentication.

Furthermore, in case the inputted fingerprint does not match with the predetermined fingerprint, or in case the recognized signature does not match with the predetermined signature, the controller may output a notification signal.

In order to achieve the above-described technical object, according to an exemplary embodiment, a method for controlling a terminal device comprising a pillar-shaped housing may include the steps of setting up a first mode, in case a rollable display unit is exposed from the housing, mapping at least one key of an input unit, which is configured to receive commands from an external source, to a key configured to perform a function respective to the first mode, storing the rollable display unit in the housing, setting up a second mode, in case a contact state detected by a grip unit, which is positioned on a lower portion of the housing and configured to detect whether or not a contact is being made, matches with a predetermined contact state, and mapping at least one key of the input unit to a key configured to perform a function respective to the second mode.

It is to be understood that both the foregoing general description and the following detailed description of this specification are exemplary and explanatory and are intended to provide further explanation of the invention as claimed.

BRIEF DESCRIPTION OF THE DRAWINGS

The accompanying drawings, which are included to provide a further understanding of this specification and are incorporated in and constitute a part of this application, illustrate embodiment(s) of this specification and together with the description serve to explain the principle of this specification. In the drawings.

DETAILED DESCRIPTION OF THE INVENTION

Figure 1:
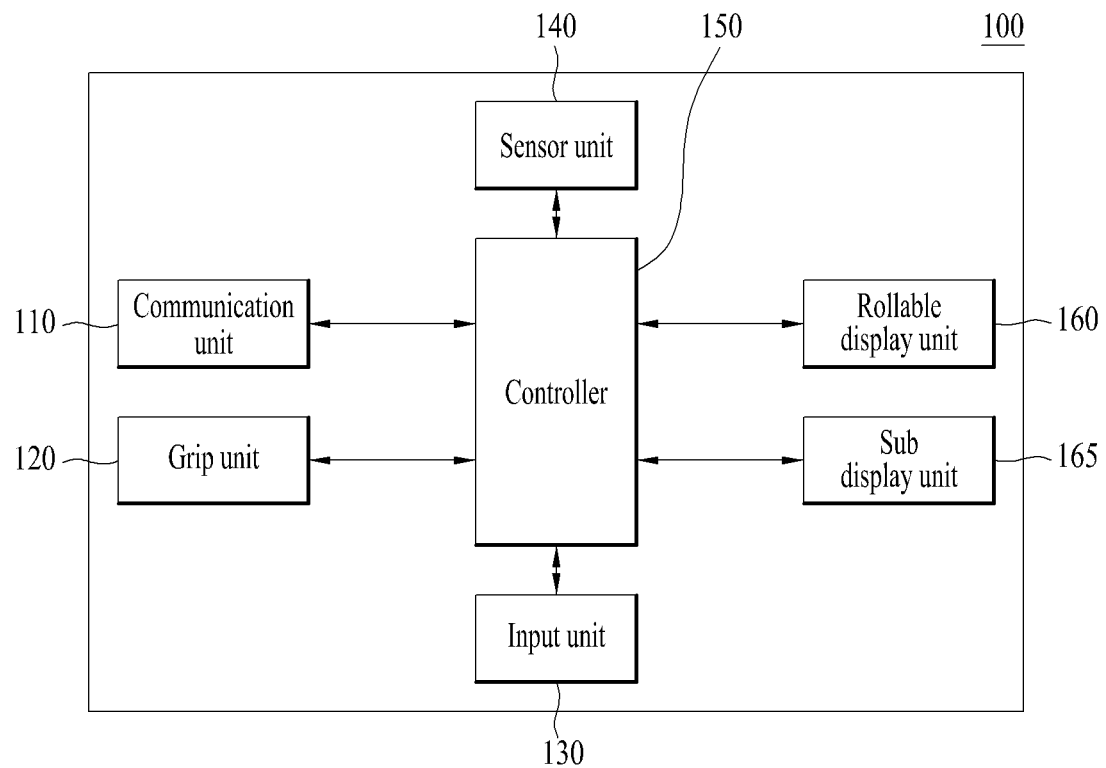
FIG. 1 illustrates a block view of a terminal device according to an exemplary embodiment.

Hereinafter, preferred exemplary embodiments of this specification that can best carry out the above-described objects of this specification will be described in detail with reference to the accompanying drawings. At this point, the structure or configuration and operations of this specification, which are illustrated in the drawings and described with respect to the drawings, will be provided in accordance with at least one exemplary embodiment of this specification. And, it will be apparent that the technical scope and spirit of this specification and the essential structure and operations of this specification will not be limited only to the exemplary embodiments set forth herein.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

FIG. 1 illustrates a block view of a terminal device according to an exemplary embodiment.

Referring to FIG. 1, a terminal device 100 may include a communication unit 110, a grip unit 120, an input unit 130, a sensor unit 140, a controller 150, a rollable display unit 160, and a sub display unit 165. The terminal device 100 may include a pillar-shaped housing. As an exemplary embodiment, the terminal device 100 may be implemented in the form of a pen. The detailed structure (or formation) of the terminal device 100 will hereinafter be described.

The communication unit 110 may perform communication with an external target. The communication unit 110 may transmit and receive (or transceive) audio signals (or voice signals) to and from an opposite party user and may also transmit and receive (or transceive) video images to and from the opposite party. Additionally, the communication unit 110 may also transmit and receive messages to and from the opposite party. Furthermore, the communication unit 110 may transmit and receive data by being connected to the Internet.

The grip unit 120 may be positioned on a lower portion of the housing so as to detect whether or not contact is being made. The terminal device 100 may include a tip at one end portion. The grip unit 120 may be formed as a predetermined region above the tip. The grip unit 120 may include a touch sensor. Accordingly, the grip unit 120 may detect the touch of an object, such as the user's finger. More specifically, the grip unit 120 may detect whether or not contact with the object is being made. Based upon a number of contact points, a location of each of the contact points, and so on, which are detected by the grip unit 120, the controller 150 may determine whether or not the detected contact is in a gripped state for performing handwriting.

The input unit 130 may receive a command from an external source. For example, the input unit 130 may be implemented in the form of a touch sensor, which can receive a touch input through a physical key, a soft key, and so on. The terminal device 100 may be operated in different operation modes based upon whether or not a flexible display unit 160 is being stored, based upon the contact state, which is detected by the grip unit 120, and so on. When the terminal device 100 is being operated in a different operation mode, the keys of the input unit 130 may also be mapped to different functions.

As an exemplary embodiment, when a rollable display unit 160 is exposed outside of the housing, the terminal device 100 may be set up to be operated in a Display mode. The Display mode may refer to an operation mode, wherein the rollable display unit 160 is unrolled, and wherein images are displayed on the display unit 160. Additionally, in case the rollable display unit 160 is stored into the housing, and in case the contact state detected by the grip unit 120 is matched with a predetermined contact state, the terminal device 100 may be set up to be operated in an Electronic Pen mode. The Electronic Pen mode may refer to an operation mode, wherein the terminal device 100 has the same form (or shape) as a generally used pen, and wherein the terminal device 100 can perform handwriting operations.

For example, when the terminal device 100 is being operated in the Display mode, one of the keys of the input unit 130 may be mapped to a Home key. When the operation mode of the terminal device 100 is shifted to the Electronic Pen mode, the key of the input unit 130, which is mapped to the Home key, may be mapped to a Send key. Alternatively, the key that is mapped to the Home key in the Display mode may be mapped to an End key in the Electronic Pen mode. A specific function that is mapped to a specific key may vary depending upon the shifting of the operation mode.

The sensor unit 140 may detect movements of the terminal device 100. The sensor unit 140 may detect whether or not the flexible display unit 160 is being stored. As described above, when the sensor unit 140 detects the exposure of the flexible display unit 140, the terminal device 100 may be set up to be operated in the Display mode. Additionally, when the terminal device 100 is being operated in the Electronic Pen mode, the sensor unit 140 may detect the movements of the terminal device 100. When the terminal device 100 is being operated in the Electronic Pen mode, the user may use the terminal device 100 as a general pen. In other words, the terminal device 100 may be used as an ordinary (or general) pen, when being operated in the Electronic Pen mode. Depending upon the user's intentions, the tip of the terminal device 100 may be moved along the shape of letters (or language characters). The sensor unit 140 may detect such movement of the tip of the terminal device 100. The movements that are detected by the sensor unit 140 may be delivered to the controller 150, and the controller 150 may recognize the respective letters (or language characters) based upon the delivered movements. Additionally, the sensor unit 140 may also detect shaking of the terminal device 100 or pressing of the tip of the terminal device 100. According to an exemplary embodiment, when the sensor unit 140 detects the shaking of the terminal device 100 in accordance with a predetermined intensity or the shaking of the terminal device during a predetermined period of time, the controller 150 may change a current menu to a next menu. Moreover, when the sensor unit 140 detects the pressing of the tip of the terminal device 100 in accordance with a predetermined intensity or during a predetermined period of time, the controller 150 may set up a Recoding mode. The Recording mode may refer to an operation mode, wherein letters (or language characters) are recognized by detecting and recognizing movements of the terminal device 100 or movements of the tip of the terminal device 100. The recognized letters (or language characters) may be transmitted to an opposite party or may be stored in the terminal device 100.

The rollable display unit 160 may either be stored in the housing or be exposed outside of the housing. The rollable display unit 160 may be rolled or bent. As described above, when the rollable display unit 160 is exposed, the terminal device 100 may be set to be operated in the Display mode. In case the terminal device 100 is operated in the Display mode, the rollable display unit 160 may display images, and so on. Also, the rollable display unit 160 may include a touch sensor. Accordingly, the rollable display unit 160 may receive a touch input from its surface. The touch input is recognized by the controller 150, and the controller 150 may execute the respective command.

Meanwhile, the rollable display unit 160 may be detached (or separated) from the housing of the terminal device 100. In case the rollable display unit 160 is detached, the rollable display unit 160 may be operated as an independent display device. In this case, the rollable display unit 160 may independently include its own input unit, controller, power unit, and so on. Additionally, the rollable display unit 160 may include a connector that can be electrically and mechanically connected to the housing of the terminal device 100.

The sub display unit 165 may is positioned on a portion of the housing. The sub display unit 165 may be positioned on part of the upper portion of the grip unit 120. The sub display unit 165 may be implemented as a general display module. The sub display unit 165 may display letters (or language characters), which are recognized by the terminal device 100, when the terminal device 100 is operated in the Electronic Pen mode. While performing a video phone call, when the terminal device 100 is shifted to the Electronic Pen mode, the sub display unit 165 may display an image of the opposite party. Furthermore, the sub display unit 165 may also display letters or an image that is required for performing authentication.

The controller 150 may control each configuration block (or element) of the terminal device 100. And, the controller 150 may set up the operation mode of the terminal device 100. As described above, when the rollable display unit 160 is exposed outside of the housing, the controller 150 may set the operation mode of the terminal device 100 to the Display mode. At this point, the controller 150 may map a key of the input unit 130 to perform a respective function corresponding to the Display mode. In case the rollable display unit 160 is stored into the housing, and in case the contact state detected by the grip unit 120 is matched with a predetermined contact state, the controller 150 may set the operation mode of the terminal device 100 to the Electronic Pen mode. At this point, the controller 150 may map a key of the input unit 130 to perform a respective function corresponding to the Electronic Pen mode. Meanwhile, the controller 150 may perform diverse functions based upon the signal detected by the sensor unit 140 or the signal inputted by the input unit 130. The detailed exemplary embodiment will hereinafter be described in detail.

Figure 2:
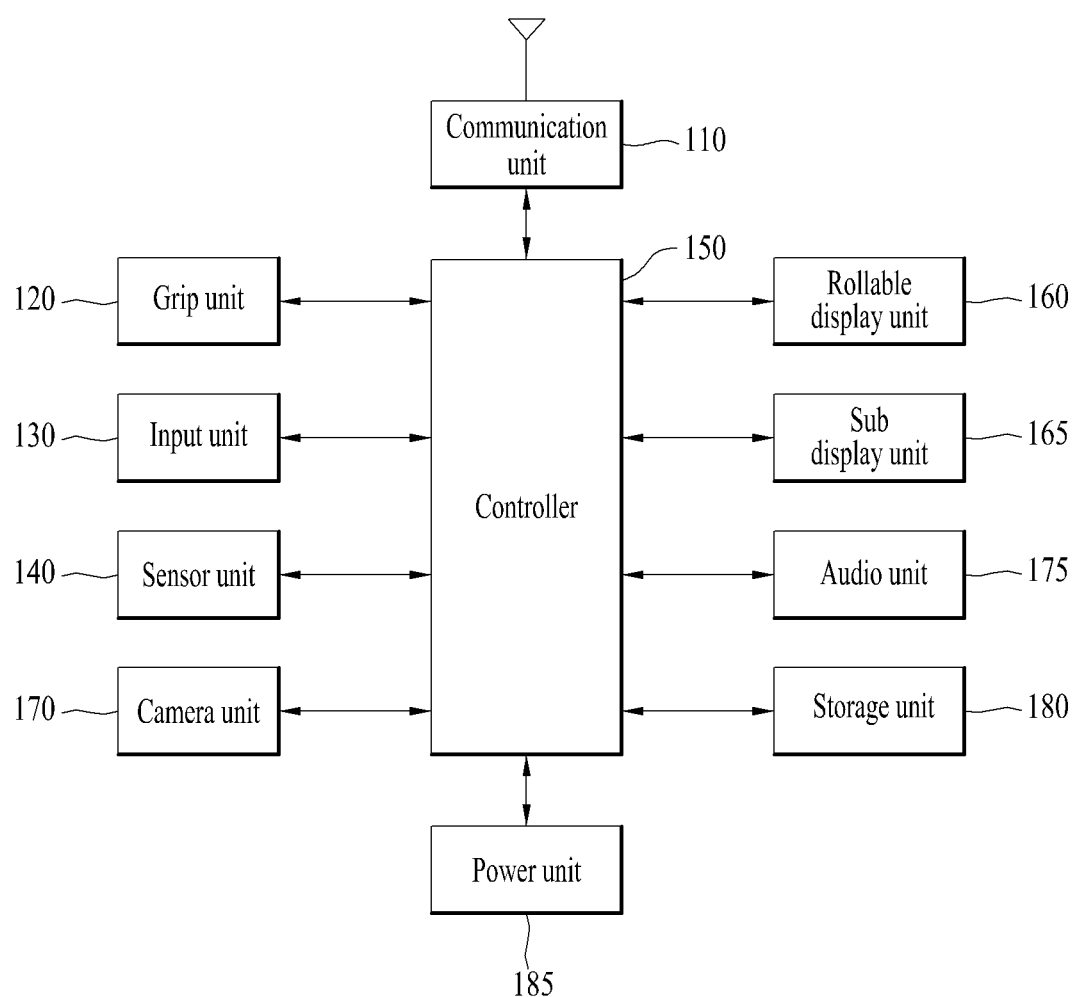
FIG. 2 illustrates a block view of a terminal device according to another exemplary embodiment.

FIG. 2 illustrates a block view of a terminal device according to another exemplary embodiment.

Referring to FIG. 2, a terminal device may include a communication unit 110, a grip unit 120, an input unit 130, a sensor unit 140, a controller 150, a rollable display unit 160, a sub display unit 165, a camera unit 170, an audio unit 175, a storage unit 180, and a power unit 185.

The communication unit 110 may perform communication with an external device and transport and receive (or transceiver) data to and from the external device by using diverse protocols. The external digital device may either correspond to a mobile terminal (or user equipment) or may correspond to a fixed terminal (or user equipment). For example, the mobile terminal may correspond to a mobile phone, a smart phone, a tablet Personal Computer (PC), a smart pad, a notebook, a digital broadcasting terminal (or user equipment), a Personal Digital Assistant (PDA), a Portable Multimedia Player (PMP), a digital camera, a navigation system (or navigator), and so on, and the fixed terminal may correspond to a desktop, a Digital Video Disc (or Digital Versatile Disc) (DVD) player, a TV, and so on.

The diverse protocols may correspond to wired or wireless communication protocols. In case of wired communication, the communication unit 110 may include diverse input/output interfaces (not shown), which are each configured to establish wired data transmission communication with the external device. For example, the interface may include a Universal Serial Bus (USB), a High Definition Multimedia Interface (HDMI), a Digital Visual Interface (DVI), IEEE 1349, or an interface based upon data transmission according to another similar standard, which is associated with data transmission. In case of wireless communication, the communication unit 110 may include an electric circuit network (or electrical network), which is based upon a wireless connection (or wireless access) to an external communication network, such as the Internet, Local Area Network (LAN), Wide Area Network (WAN), and so on. The wireless network that is accessed by the communication unit 110 may be supported with Global System for Mobile Communications (GSM), an Enhanced Data GSM Environment (EDGE), Code Division Multiple Access (CDMA), Wideband Code Division Multiple Access (W-CDMA), Time Division Multiple Access (TDMA), Wibro, and, may also be supported with an interface for a mobile communication method, such as High Speed Packet Access (HSPA), High Speed Downlink Packet Access (HS-DPA), Long Term Evolution (LTE), and so on, or an interface for a close-range communication method, such as Bluetooth, Radio Frequency Identification (RFID), Infrared Data Association (IrDA), Ultra Wideband (UWB), ZigBee, Wireless LAN (WLAN) (or Wi-Fi), and so on.

Herein, the wired and/or wireless interface methods merely correspond to exemplary embodiments that are provided in order to facilitate the understanding of this specification. And, since the interface method for transmitting and/or receiving information may be easily changed by anyone skilled in the art, the interface method presented in this specification will not be limited only to the above-described exemplary embodiments.

The grip unit 120 may detect a contact made by the user. In the Electronic Pen mode, the grip unit 120 may detect the user's contact method. The terminal device may set up the Electronic Pen mode based upon the detected contact method and based upon whether or not the rollable display unit 160 is being stored. In the Electronic Pen mode, the grip unit 120 may correspond to a handle portion, which is held by the user in order to perform handwriting. Accordingly, the grip unit 120 may be positioned in an area above the tip of the terminal device. Herein, the grip unit 120 may be formed of a material, such as rubber, silicon, and so on.

Meanwhile, the grip unit 120 may further include a fingerprint recognition sensor. Accordingly, the grip unit 120 may receive a fingerprint of the contacted finger of the user. The user's fingerprint, which is received from the grip unit 120, may be used for cancelling (or releasing) security settings.

The input unit 130 may receive a user command from an external source. The input unit 130 may be implemented by using diverse methods. For example, the input unit 130 may be implemented as a mouse, a touchpad, a button, a soft key, and so on. In a broader meaning, the input unit 130 may include a microphone, a touchscreen, and so on. The microphone may receive a voice of the user, and the touchscreen may receive a touch gesture of the user. In some cases, the microphone may be included in an audio unit, and the touchscreen may be included in a display unit.

The sensor unit 140 may detect a surrounding environment of the terminal device by using at least one sensor, which is equipped to the terminal device, and may deliver the detected environment to the controller 150. Additionally, the sensor unit 140 may detect a user input and may deliver the detected user input to the controller 150. At this point, the sensor unit 140 may include at least one sensing means. For example, the at least one sensing means may include diverse sensing means, such as a gravity sensor, a geomagnetic (or terrestrial magnetism) sensor, a motion sensor, a gyro sensor (or gyroscopic sensor), an acceleration sensor, an infrared sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, a fingerprint sensor, and so on. The sensor unit 140 collectively refers to the above-described diverse sensing means, and the sensor unit 140 senses diverse inputs inputted by the user and the user's environment, and, then, the sensor unit 140 delivers the sensed result to the controller 150, so that the controller 150 can perform operations respective to the received sensed result. The above-described sensing means may each be included in the terminal device as a separate element, or at least one or more sensing units may be combined (or integrated), so as to be included in the terminal device as at least one or more integrated elements.

According to the exemplary embodiment of this specification, the terminal device may be equipped with the sensor unit 140, which is mounted on the grip unit 120, the rollable display unit 160, or the sub display unit 165. Accordingly, the diverse user inputs, which are performed on the grip unit 120, the rollable display unit 160, or the sub display unit 165, may be detected by the sensor unit 140. For example, in case the sensor unit 140 includes a touch sensor, the terminal device may receive diverse touch inputs of the user, which are performed on the rollable display unit 160 or the sub display unit 165. In case the sensor unit 140 includes a fingerprint sensor, the terminal device may collect fingerprint information of the user from the user input, which is performed on the grip unit 120. Furthermore, the sensor unit 140 may be provided on the tip portion of the terminal device, thereby being capable of detecting the intensity or time (or duration) according to which the tip is being pressed and also being capable of detecting the movement of the terminal device.

The controller 150 may execute contents that are stored in the storage unit 180, contents that are received via data communication, and so on. Additionally, the controller 150 may execute diverse applications and may perform processing on data stored in the terminal device. Additionally, the controller 150 may control each of the above-described elements of the terminal device, and the controller 150 may also control data transmission and/or reception (or data transception) between each of the elements. The controller 150 may include a processor, an application-specific integrated circuit (ASIC), another chip set, a logical circuit, a register, a communication modem, a data processing device, and so on, that are well-known to the related field of technology for executing diverse control logics, which will hereinafter be described in detail. Moreover, in case the above-described control logic is implemented as software, the controller 150 may be implemented as a collection (or group) of program modules. At this point, a program module may be stored in the storage unit 180 and may be executed by a processor.

The rollable display unit 160 and the sub display unit 165 may output an image on the display screen. The rollable display unit 160 and the sub display unit 165 may output an image based upon contents or a control command being executed by the controller 150. In case the flexible display unit 160 is stored in the terminal device, the sub display unit 165 may display an image of the opposite party, handwritten content, which is detected by the sensor unit 140 in accordance with the movement of the terminal device and recognized by the controller 150, and so on.

The camera unit 170 may capture (or record) an image of the surrounding environment of the terminal device and may convert the captured (or recorded) image to an electrical signal. In order to do so, the camera unit 170 may include an image sensor that is configured to convert optical signals to electrical signals. The image, which is captured (or recorded) by the camera unit 170, and which is then converted to an electrical signal, may be stored in the storage unit 180 and then outputted to the controller 150, or may be immediately outputted to the controller 150 without being stored. Additionally, the image being captured (or recorded) by the camera unit 170 may correspond to a still image or a moving picture image. The camera unit 170 may also be used as a motion senor or a video sensor. And, whenever required, the camera unit 170 may include diverse cameras.

The audio unit 175 may include an audio outputting means, such as speakers, and so on, and an audio inputting means, such as a microphone, and so on. The outputting means may output an audio signal of a content that is being executed in the terminal device. The content may be provided by the storage unit 180 or may be provided from an external device through the communication unit 110. The outputting means may include at least one of an air conduction speaker and a bone conduction speaker. The air conduction speaker corresponds to earphones, and so on. The air conduction speaker resonates (or oscillates) the air in accordance with the audio signal, so as to generate sound waves. More specifically, the resonance of the sound being delivered through the air is delivered to the eardrum, which is located inside of the ear, and the oscillation of the eardrum is delivered to a snail (or cochlea), which consists of a helical form, after passing through three bones located inside the eardrum. The snail is filled with a fluid, which is referred to as lymph fluid, and oscillation occurring in this fluid is changed (or converted) to electrical signals, which are delivered to auditory nerves, thereby allowing the user's brain to acknowledge (or recognize) the corresponding sound. The bone conduction speaker may be positioned to diverse positions that can easily provide audio signals, which are converted to frequency-type oscillation (or resonance), to the user. If the bone conduction speaker is used, by having the audio signal operate the bone conduction speaker, bone conduction sound waves are delivered to the user's cranial bone, and frequency-type resonance is delivered to the user's internal ear (or inner ear). Thus, if the bone conduction speaker is used, the user may be capable of hearing the audio signal without harming his (or her) eardrums. Meanwhile, the audio unit 175 may also be used as an audio sensor.

In this specification, the camera unit 170 may capture (or record) the user when performing a video phone call. Additionally, in case the rollable display unit 160 is detached from the housing of the terminal device, the camera unit 170 may also be used for scanning purposes.

The storage unit 180 may store diverse types of digital device, such as video data, audio data, pictures, applications, and so on. An application may correspond to a program for performing operations of the controller 150. Additionally, the video or picture may correspond to data being acquired by the camera unit 170. The storage unit 180 may be implemented in diverse forms, such as a Random Access Memory (RAM), a Static Random Access Memory (SRAM), a Read Only Memory (ROM), an Electrically Erasable Programmable Read Only Memory (EEPROM), a Programmable Read Only Memory (PROM), and so on. Additionally, the storage unit 180 may also be operated in association with a web storage over the Internet, thereby being capable of performing a storage function. Additionally, the storage unit 180 may further include an external storage medium, which is detachably fixed to the terminal device. The external storage medium may consist of a slot type, such as a Secure Digital (SD) memory or a Compact Flash (CF) memory, a memory stick type, a Universal Serial Bus (USB) type, and so on. More specifically, the external storage medium may be detachably fixed to the terminal device, and the external storage medium may provide diverse types of content, such as audio content, pictures, moving picture images, applications, and so on, to the terminal device. For example, the storage unit 180 may include a RAM, a ROM, a cache memory, a hard disk drive (HDD), a solid state drive (SSD), a compact disk (CD), a digital versatile disk (DVD), a Bluray disk, a floppy disk drive (FDD), a magnetic disk, a memory card, a flash memory, a USB memory, and so on.

As a power source being connected to a battery or an external power, the power unit 185 may supply power to the terminal device. The battery includes a primary battery as well as a secondary battery. Herein, the secondary battery may be configured of a rechargeable lithium ion battery, lithium polymer battery, nickel cadmium battery, nickel metal hydrogen battery, nickel iron battery, and so on.

Meanwhile, a terminal device may refer to diverse types of devices that can process digital data and perform operations corresponding to the processed data. As the performance of such terminal device is enhanced, diverse types of content may be executed by the terminal device. For example, the terminal device may include a TV, a laptop computer, a desktop computer, a monitor, a smartphone, a tablet PC, a navigator (or navigation system), a PMP, a payment device, a security device, a kiosk, and so on. Most particularly, portable devices that have recently been widely used are also being used as playback devices (or reproduction devices) for playing comprehensive multimedia content.

Hereinafter, the shape (or form) of the terminal device will be described in detail.

Figure 3:
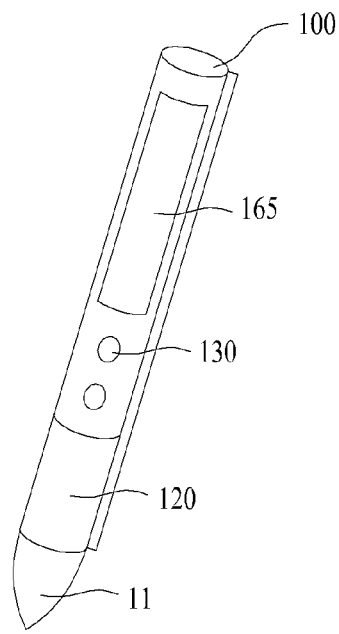
FIG. 3 illustrates a terminal device including a flexible display unit according to an exemplary embodiment.
Figure 3:
Figure 3:

FIG. 3 illustrates a terminal device including a flexible display unit according to an exemplary embodiment.

FIG. 3(*a*) illustrates a terminal device 100 having the rollable display unit 160 stored in the terminal device 100. Herein, the terminal device 100 may include a pillar-shaped housing. For example, the pillar may be implemented as a cylinder pillar or a polygonal pillar. A tip 11 may be positioned on a lower end of the pillar-shaped housing. The tip 11 may be implemented in the form of a pen point. However, the tip 11 does not include ink, but the tip 11 may include a sensor configured to detect the movement of the tip 11, pressure applied on the tip 11, and so on. A grip unit 120 may be positioned above the tip 11. The grip unit 120 may be implemented to have the form of a handle or grip (or handheld part) of the pen. The grip unit 120 may be implemented as a single layer enveloping the pillar-shaped housing, so that the user can hold (or grip) the pen in any arbitrary direction. The grip unit 120 may include a sensor configured to be capable of detecting a contact of the user.

An input unit 130 may be positioned above the grip unit 120. The input unit 130 may be implemented as a physical key, a soft key, a touchpad, and so on. In FIG. 3, although the input unit 130 is illustrated as an element that is separate from a sub display unit 165, the input unit 130 may include a touch panel, which is provided on the sub display unit 165. The same key of the input unit 130 may be mapped to different functions depending upon the operation mode of the terminal device 100. For example, a key that is configured to perform the End function in the Electronic Pen mode may be mapped to a Home function in the Display mode. Alternatively, when an incoming call is received, the key that is configured to perform the End function in the Electronic Pen mode may be mapped to a Receive Call function. Alternatively, a key that is configured to perform a Send Message function in the Electronic Pen mode may be mapped to a Home function in the Display mode. The above-described mapping key shifting is merely exemplary, and the key of the input unit 130 may be mapped to diverse functions. Additionally, some of the keys included in the input unit 130 may be mapped to the same function regardless of the operation mode. According to an exemplary embodiment, the Power key of the input unit 130 may perform Power On-Off functions regardless of the operation mode.

The sub display unit 165 may be positioned above the input unit 130. Alternatively, the sub display unit 165 may include a touch sensor, so as to be capable of receiving a touch input. More specifically, the sub display unit 165 may be implemented as a single body with the input unit 130. Alternatively, the input unit 130 may also be positioned above the sub display unit 165. More specifically, the terminal device 100 may sequentially include the tip 11, which is located at the lowermost portion of the terminal device 100, the grip unit 120, the sub display unit 165, and the input unit 130, which is located at the uppermost portion of the terminal device 100.

A rollable display unit 160 may be stored inside the housing of the terminal device 100.

FIG. 3(*b*) illustrates the terminal device 100 having its rollable display unit 160 exposed outside of the terminal device 100. The rollable display unit 160 may be exposed outside of the terminal device 100 or may be stored inside the terminal device 100. In case the rollable display unit 160 is exposed outside of the housing, the terminal device 100 may be set up to be operated in the Display mode. And, the terminal device 100 may map a key of the input unit 130 to a key that is configured to perform a function respective to the Display mode. The rollable display unit 160 may include a touch sensor, thereby being capable of receiving a touch input from the user.

The terminal device 100 may include a material having elastic properties inside the housing. The rollable display unit 160 may be rolled around the material having elastic properties. More specifically, in case the rollable display unit 160 receives a force exposing the rollable display unit 160 outside of the terminal device 100, the rolled rollable display unit 160 may be exposed to the outside of the terminal device 100. Thereafter, when the force is no longer applied, the rollable display unit 160 may be stored back inside the housing by being rolled due to the elastic property of the material provided in the housing. Alternatively, the tip 11 may be rotatably provided and a portion of the tip 11 may be included inside the housing. The portion of the tip 11 that is included inside the housing may be connected to the rollable display unit 160. Accordingly, the rollable display unit 160 may be stored inside the housing or exposed outside of the housing in accordance with the rotation of the tip 11. Alternatively, a portion of an axis, which is provided as an element separate from the tip 11, and which is configured to roll the rollable display unit 160, may be exposed outside of the housing. Thereafter, when the exposed portion of the axis being exposed outside of the housing is rotated, the rollable display unit 160 may either be exposed or stored.

Figure 4:
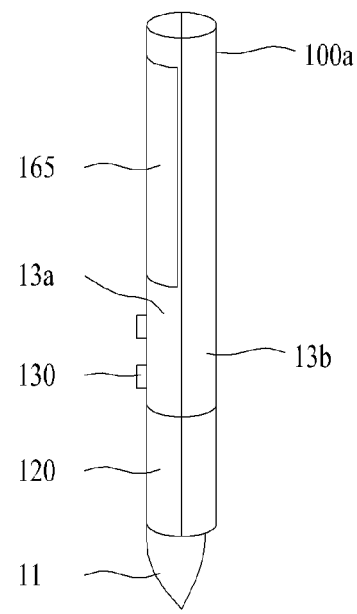
FIG. 4 illustrates a terminal device including a flexible display unit according to another exemplary embodiment.
Figure 4:
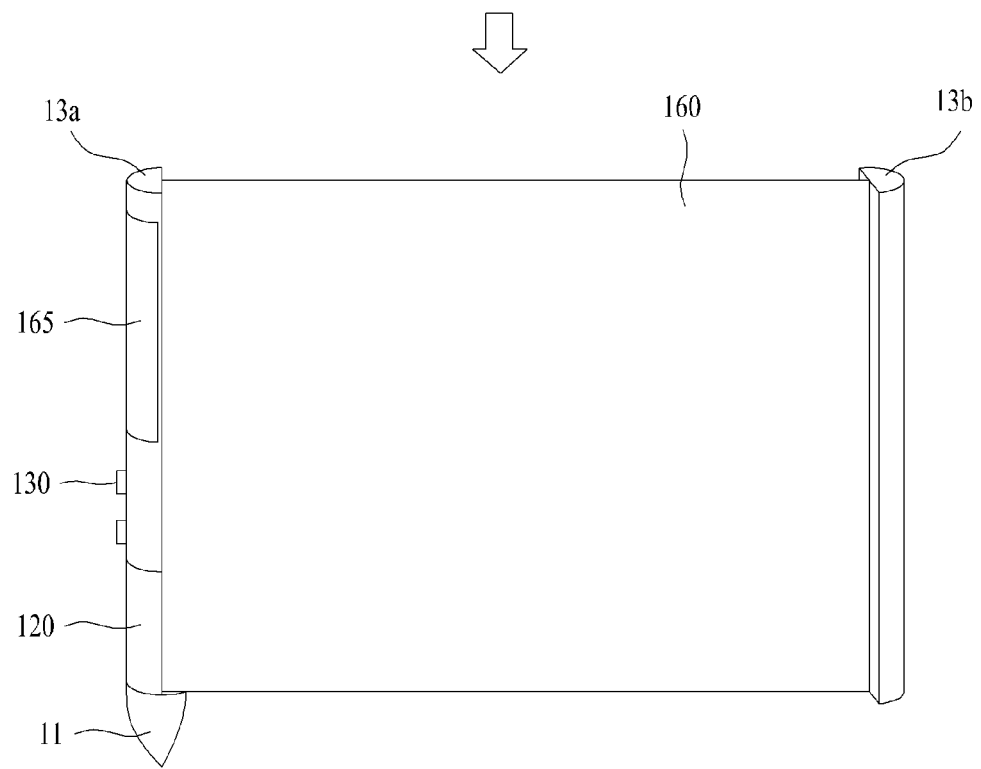

FIG. 4 illustrates a terminal device including a flexible display unit according to another exemplary embodiment.

FIG. 4(*a*) illustrates a terminal device 100*a* having the rollable display unit 160 stored in the terminal device 100*a*. The terminal device 100*a* may include a tip 11, a grip unit 120, an input unit 130, and a sub display unit 165. Since each of the elements included in the terminal device 100*a* is identical to those described above with reference to FIG. 3, the detailed description of the same will be omitted for simplicity.

The terminal device 100a may include a first part 13a and a second part 13b. The first part 13a and the second part 13b may be separated from one another. Both ends of the rollable display unit 160, which is shown in FIG. 4(b), may be respectively connected to the first part 13a and the second part 13b of the terminal device 100a. More specifically, the first part 13a and the second part 13b may be separated from one another, and the rollable display unit 160 may be exposed in accordance with the separation between the first part 13a and the second part 13b. The first part 13a or the second part 13b may include a material having elastic properties. The rollable display unit 160 may be rolled around the material having elastic properties. When the first part 13a and the second part 13b are separated from one another, the rolled rollable display unit 160 may be unrolled and then exposed outside of the housing. When the first part 13a and the second part 13b are connected (or re-united) back to one another, the rollable display unit 160 may be stored back inside the housing by being rolled around the material having elastic properties.

More specifically, the housing of the terminal device 100a may include a first part 13a and a second part 13b, which are configured to be separated from one another along left-to-right directions based upon a major axis. The rollable display unit 160 may be fixed to the first part 13a and the second part 13b, and the rollable display unit 160 may be stored inside at least any one of the first part 13a and the second part 13b. In case the first part 13a and the second part 13b are separated from one another and unfolded (or spread out), the stored rollable display unit 160 may be exposed. Thereafter, in case the first part 13a and the second part 13b are re-united, the rollable display unit 160 may be stored inside at least any one of the first part 13a and the second part 13b.

The tip 11 may be connected to at least any one of the first part 13a and the second part 13b. Accordingly, when the first part 13a and the second part 13b are separated from one another, the tip 11 may exist in only one of the first part 13a and the second part 13b.

Figure 5:
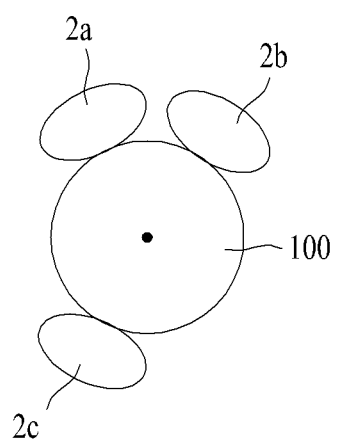
FIG. 5 illustrates a method for the terminal device to detect a contact status.

FIG. 5 illustrates a method for the terminal device to detect a contact status.

Generally, when a user holds a pen, three sections (or parts) of the pen may be contacted by the user's fingers. One contacting part may perform a function of supporting a lower portion of the pen, and two contacting parts may each perform a function of supporting an upper portion of the pen. If only two parts of the pen are contacted by the user's fingers, the grip structure may become instable. Additionally, having the user's fingers contact four or more parts of the pen is practically impossible considering the structures of the pen and the human hand. Therefore, a general and stable grip structure of a pen corresponds to the structure of contacting three parts of the pen with the user's fingers.

FIG. 5 illustrates a structure of the terminal device 100 that is seen from the bottom of the terminal device 100. The terminal device 100 is gripped by the user's fingers 2a, 2b, and 2c. As described above, a first finger 2c of the user may support the lower portion of the pen when performing handwriting. And, a second finger 2a and a third finger 2b of the user may collectively support the upper portion of the pen when performing handwriting. The user may grip the grip unit of the terminal device 100. The grip unit may detect whether or not the terminal device 100 is being contacted by the user. When the user's contact is detected, the grip unit may send the detected contact information to the controller. When the received contact information matches with predetermined contact information, the controller may recognize that detect user contact as a grip for performing handwriting. More specifically, the controller may configure in advance contact positions of three contacts, which consist of two neighboring contacts and another contact that is spaced apart from the two neighboring contacts. Thereafter, based upon the received contact information, the controller may determine whether the detected contact points correspond to three contact points, and whether or not the detected contact points correspond to the respective predetermined contact points (or positions). The controller may then compare the received contact information with the predetermined contact information, so as to determine whether or not both contact information match one another.

Diverse exemplary embodiments of the terminal device will hereinafter be described in detail.

Figure 6:
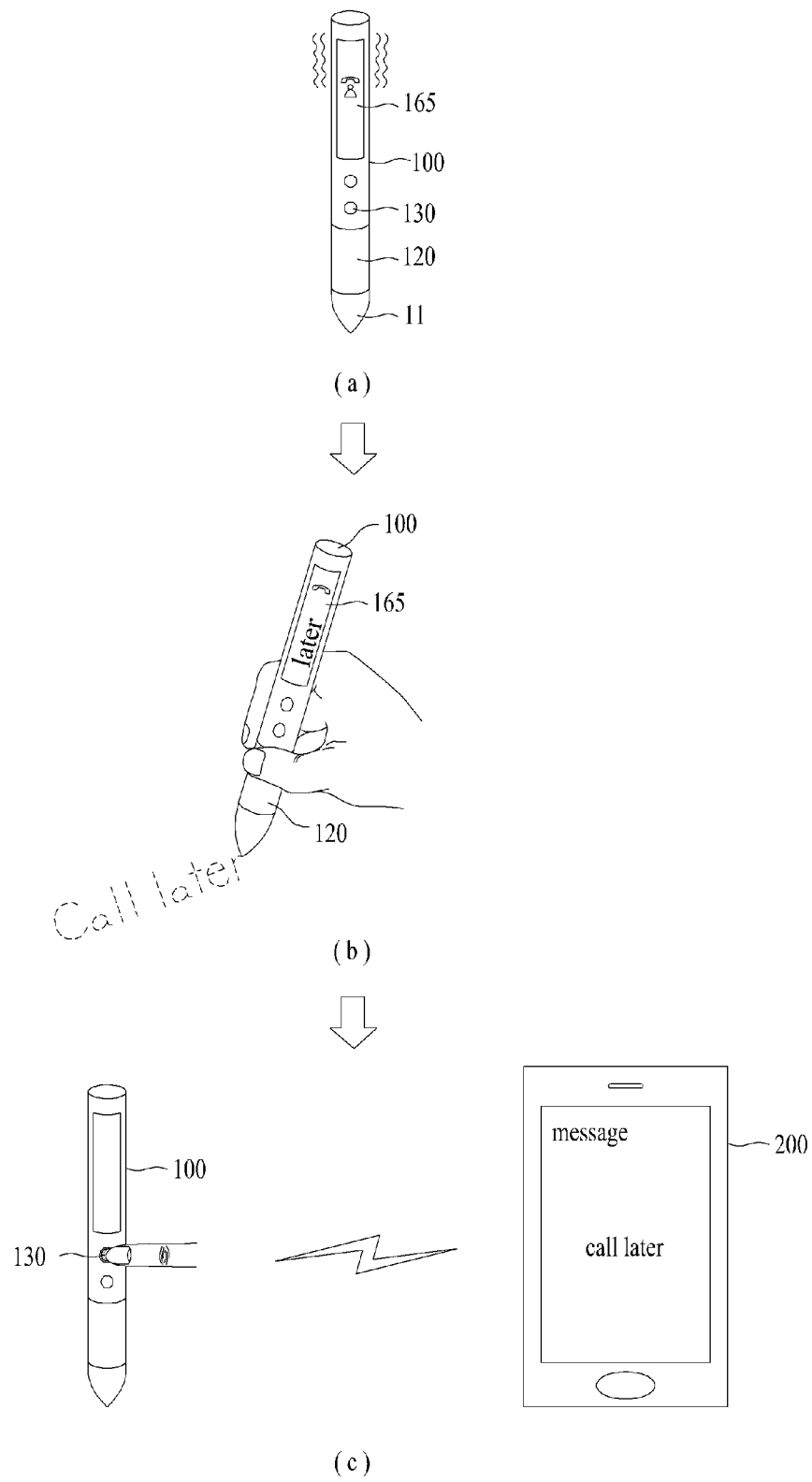
FIG. 6 illustrates a process of transmitting a Reject Call message.

FIG. 6 illustrates a process of transmitting a Reject Call message.

Referring to FIG. 6(a), a terminal device 100 receiving an incoming call is illustrated herein. The terminal device 100 may be in an Electronic Pen mode having the rollable display unit stored in the housing. When an incoming call is received, the terminal device 100 may display the incoming call information that is being received on the sub display unit 165. More specifically, the sub display unit 165 may display an image indicating the call reception and information on the opposite party. In case the size of the data that are to be displayed is larger than the area that is available for display (i.e., the displayable area), the terminal device 100 may display the data as though the data are flowing. For example, in case the number of letters that can be displayed by the sub display unit 165 is equal to 5 letters, and in case the size of the data that are to be displayed is equal to 10 letters, the terminal device 100 may first display the first letter to the fifth letter of the data that are to be displayed, and, then, after erasing (or removing) the first letter, the terminal device 100 may display the sixth letter by collectively moving (of shifting) the displayed second to fifth letters forward by one space.

The terminal device 100 may include an audio unit, thereby being capable of outputting a sound indicating the reception of an incoming call. Additionally, the terminal device 100 may include a motor, thereby being capable of outputting a vibration indicating the reception of an incoming call.

FIG. 6(b) illustrates an exemplary embodiment of performing handwriting by using the terminal device 100. While an incoming call is being received, the user may reject the reception of the incoming call and may transmit a respective message to the opposite party. For example, the tip 11 of the terminal device 100 may include a sensor module. When the tip 11 is pressed at a predetermined pressure or more, the terminal device 100 may execute the Recording mode. Alternatively, after receiving the incoming call, the terminal device 100 may recognize the movement of the terminal device 100 as a message. Alternatively, in case the terminal device 100 satisfies a predetermined condition, the terminal device 100 may recognize the movement of the terminal device 100 as a message. As an exemplary embodiment, the predetermined condition may correspond to a condition wherein the terminal device 100 is in a predetermined contact state after receiving the incoming call, a condition wherein the terminal device 100 is in a predetermined contact state after being in parallel with the ground surface, a condition wherein the terminal device 100 is in a predetermined contact state after being perpendicular to the ground surface, and so on.

In the Recording mode, the terminal device 100 may detect the movement of the terminal device 100, thereby recognizing the message. For example, in case the user writes the letters configuring the phrase 'call later' by using the terminal device 100, the terminal device 100 may recognize the message indicating 'call later' based upon the movement of the terminal device 100. The terminal device 100 may display the recognized message on the sub display unit 165, or the terminal device 100 may store the recognized message. The input unit 130 may include a key performing a Cancel function. When the terminal device 100 receives an input of a Cancel command, the terminal device 100 may delete the recognized message. When the user newly writes (or rewrites) the letters, the terminal device 100 may recognize the newly written message.

FIG. 6(c) illustrates an exemplary embodiment of the terminal device 100 transmitting a message to the opposite party. The terminal device 100 may detect the movement of the terminal device 100 and may recognize the message of the user based upon the detected movement. The recognized message may be displayed on the sub display unit 165, or the recognized message may be stored in the storage unit. The input unit 130 of the terminal device 100 may include a key performing a Send Message function. If the terminal device 100 receives a Send command after recognizing the message, the terminal device 100 may transmit the recognized message to the opposite party. Thereafter, the terminal device 100 may reject the reception of the incoming call. An opposite terminal device 200 (i.e., a terminal device 200 of the opposite party) may display the received message. Alternatively, the terminal device 100 may include a key performing an End Incoming Call function or a Reject Incoming Call function. After recognizing the message, when the terminal device 100 receives an End Call command or a Reject Call command, the terminal device 100 may transmit the recognized message to the opposite party. Thereafter, the terminal device 100 may reject the incoming call.

More specifically, when an incoming call is being received, while the terminal device 100 is being operated in the Electronic Pen mode, the terminal device 100 may recognize a message based upon a signal, which is detected in accordance with the movement of the terminal device 100. Thereafter, when a Reject Reception command is inputted, the terminal device 100 may transmit the recognized message to the opposite party.

Figure 7:
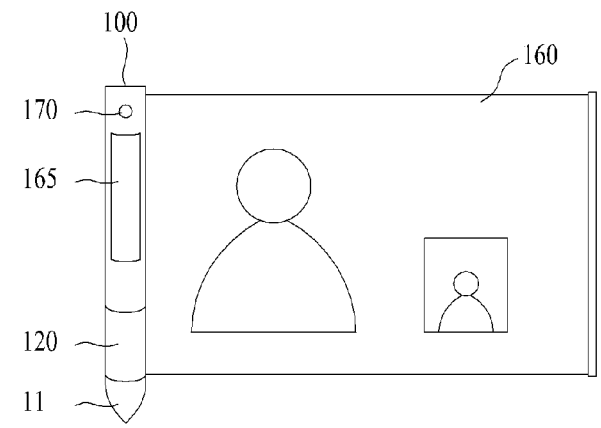
FIG. 7 illustrates a process of transmitting a message to an opposite party according to an exemplary embodiment.
Figure 7:
Figure 7:
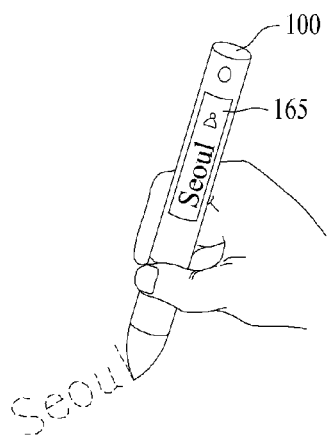
Figure 7:
Figure 7:
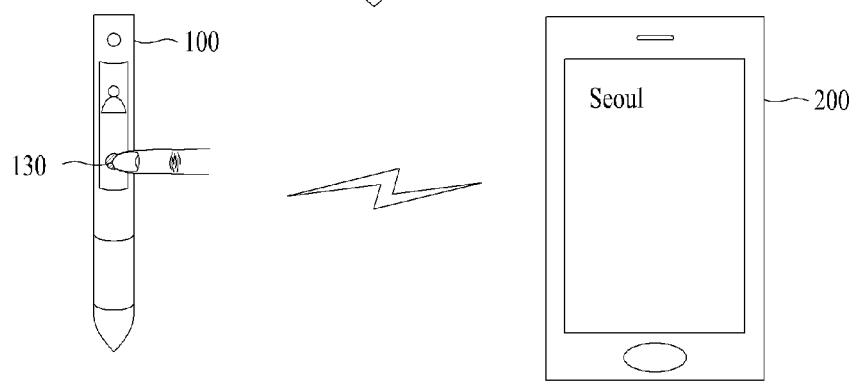

FIG. 7 illustrates a process of transmitting a message to an opposite party according to an exemplary embodiment.

Referring to FIG. 7(a), the terminal device 100 having the rollable display unit 160 unrolled (or spread out) is illustrated. As described above, the terminal device 100 may include a tip 11, a grip unit 120, and a sub display unit 165. Additionally, the terminal device 100 may further include a camera unit 170. Meanwhile, the input unit 130 of the terminal device 100 may be implemented as a single body with the sub display unit 165.

In case the rollable display unit 160 is exposed, the terminal device 100 is being operated in the Display mode. The rollable display unit 160 may display diverse types of data. The terminal device 100 may execute a Video Phone mode. In the Video Phone mode, the rollable display unit 160 may display an image of the opposite party and an image of the user himself (or herself). While carrying out a phone conversation with the opposite party, the rollable display unit 160 may be stored in the housing.

FIG. 7(b) illustrates an exemplary embodiment of performing handwriting by using the terminal device 100. In case the rollable display unit 160 is being stored in the housing while a phone conversation is being carried out, the terminal device 100 may be shifted to a speaker phone. The sub display unit 165 may display an image of the opposite party or information on the opposite party. Thereafter, in case the contact state of the grip unit 120 matches with the predetermined contact state, the terminal device 100 may recognize a message based upon a signal, which is detected by the sensor unit in accordance with the movement of the terminal device 100. Alternatively, in case the pressure being applied to the tip 11 of the terminal device 100 is equal to a greater than a predetermined pressure, the terminal device 100 may execute the Recording mode. And, in case the terminal device 100 satisfies a predetermined condition, the terminal device may execute the Recording mode. The terminal device 100 may store the recognized message in the storage unit.

FIG. 7(c) illustrates an exemplary embodiment of the terminal device 100 transmitting a message to the opposite party. The terminal device 100 may detect the movement of the terminal device 100 and may recognize the message of the user based upon the detected movement. The recognized message may be displayed on the sub display unit 165. The input unit 130 of the terminal device 100 may include a key performing a Send Message function. In case the input unit 130 is implemented as a single body with the sub display unit 165, the key performing the Send (or Transmit) function may correspond to a key provided on the touch panel.

After recognizing the message, when the terminal device 100 receives a Send (or Transmit) command, the terminal device 100 may transmit the recognized message to the opposite party. The opposite terminal device 200 may display the received message.

More specifically, in case the rollable display unit 160 is stored in the housing, and in case the contact state detected by the grip unit 120 matches with the predetermined contact state, the terminal device 100 may recognize a message based upon the signal, which is detected in accordance with the movement of the terminal device 100, and, when the terminal device 100 receives a Send (or Transmit) command, the terminal device 100 may transmit the recognized message to the opposite party.

Meanwhile, when an incoming call is being received while the terminal device 100 is being operated in the Electronic Pen mode, and when the rollable display unit 160 is being exposed, the terminal device 100 may activate the Video Phone function.

Figure 8:
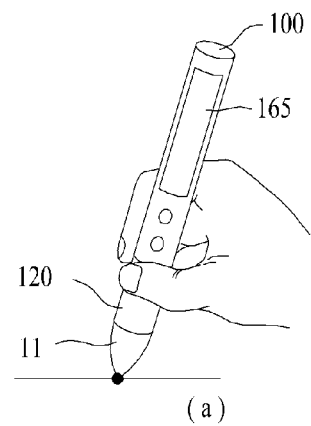
FIG. 8 illustrates a Recording mode according to an exemplary embodiment.
Figure 8:
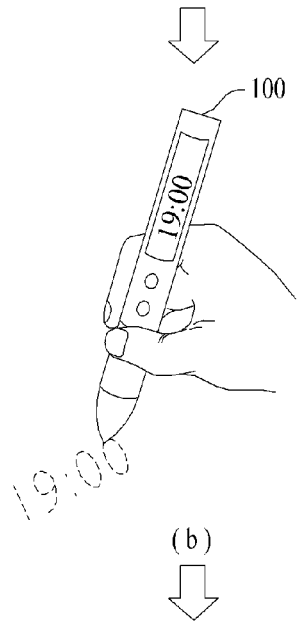
Figure 8:
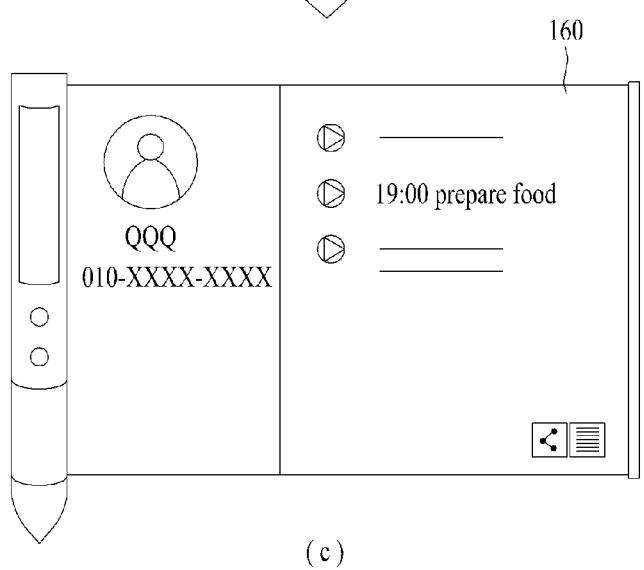

FIG. 8 illustrates a Recording mode according to an exemplary embodiment.

Referring to FIG. 8(a), a terminal device 100 receiving an incoming call is illustrated herein. The terminal device 100 may be in an Electronic Pen mode having the rollable display unit stored in the housing. The tip 11 of the terminal device 100 may include a sensor unit. In case the tip 11 is pressed at a predetermined pressure or more, or in case the tip 11 is pressed for a predetermined first time period or more, the terminal device 100 may establish a phone connection (or call connection). In case a phone call (or phone conversation) is carried out in the Electronic Pen mode, a Speaker Phone function may be activated. More specifically, when an incoming call is being received while the terminal device 100 is being operated in the Electronic Pen mode, in case an end part (e.g., tip) 11 of the lower portion of the housing contacts an object for a predetermined first time period or more, or in case the end part 11 is pressed at a predetermined pressure or more, the terminal device 100 may activate the Speaker Phone function, so as to establish a call connection. The user may carry out a phone call (or phone conversation) while performing handwriting.

FIG. 8(b) illustrates an exemplary embodiment of performing handwriting by using the terminal device 100. In case the contact state of the grip unit 120 matches with the predetermined contact state, the terminal device 100 may execute the Recording mode. While being operated in the Recording mode, the terminal device 100 may recognize a message by detecting the movement of the terminal device 100. For example, when the user writes '19:00' by using the terminal device 100, the terminal device 100 may recognize a message indicating '19:00' based upon the movement of the terminal device 100. The terminal device 100 may display the recognized message on the sub display unit 165. The terminal device 100 may also store the recognized message along with the call information (or phone call information).

Meanwhile, the input unit 130 may include a key performing a Cancel function. When the terminal device 100 receives an input of a Cancel command, the terminal device 100 may delete the recognized message. When the user newly writes (or rewrites) the letters, the terminal device 100 may recognize the newly written message. Additionally, the terminal device 100 may detect a movement of the user only when the tip 11 of the terminal device 100 moves while contacting an object. Alternatively, the terminal device 100 may detect a movement of the user only when the tip 11 of the terminal device 100 moves within a predetermined distance from the object. According to an exemplary embodiment, when the terminal device 100 is executing the Recording mode, in case the tip 11 contacts an object for a predetermined second time period or more, the terminal device 100 may end (or cease) the execution of the Recording mode.

FIG. 8(c) illustrates an exemplary embodiment of a message being recorded along with call information. The message that is being recorded in the Recording mode may be stored along with the call information. According to an exemplary embodiment, the call information may refer to a call reception time, a phone call (or phone conversation) time, a sender, a recording time of the recognized message, a voice-recording file of a phone call, and so on. For example, as shown in FIG. 8(c), the user has carried out a phone conversation with a person named QQQ from 15:00 p.m. to 15:30 p.m., and the user may have written a message indicating '19:00 Prepare food' for a time period of 30 seconds at 15:10 p.m. An exemplary embodiment of recording a message while carrying out a phone conversation (or phone call) has been described above with reference to FIG. 8(b). After the phone call is ended, the rollable display unit 160 may be exposed outside of the housing. The rollable display unit 160 may display the recognized message along with the call information. For example, the terminal device 100 may display user information of the opposite party, and the terminal device 100 may also display information on the phone conversation that is carried out between the user and his (or her) opposite party. In case the call information corresponds to a voice-recording file of the phone conversation, the terminal device 100 may display a message indicating '19:00 prepare food' along with a recorded file consisting of a voice-recording of the phone conversation carried out between 15:00 p.m. and 15:30 p.m. The terminal device 100 may also display previous or following call information with the opposite party in the form of a list, and the terminal device 100 may also include a Shift to other call information menu or a Share menu. According to an exemplary embodiment, when the Shift to other call information menu is selected, the terminal device 100 may display a message along with the other call information. For example, when the call information corresponds to the reception time of the respective call, the terminal device 100 may display 15:00 p.m. along with the message. If the call information corresponds to a duration time of the phone conversation (or phone call), the terminal device 100 may display From 15:00 p.m. to 15:30 p.m. along with the message. If the call information corresponds to the recorded time of the recognized message, the terminal device 100 may display From 15:10:00 p.m. to 15:10:30 p.m. along with the message. If the call information corresponds to a voice-recording file of the message-recording phone conversation, the terminal device 100 may display a voice-recorded file of the phone conversation that is recorded for 30 seconds starting from 15:10:00 p.m. In case the call information corresponds to a voice-recording file of the phone conversation, and when the voice-recording file of the phone conversation is selected, the terminal device 100 may playback (or reproduce) the voice-recorded file.

Additionally, if an opposite party is selected, and if the Share menu is selected, or if a Send (or Transmit) command is received, the terminal device 100 may transmit the recognized message to the selected opposite party.

The terminal device 100 may recognize the contact of the user's finger(s) through the grip unit 120, and the terminal device 100 may recognize a message through the handwriting movement of the user. Accordingly, the terminal device 100 may set-up (or configure) a Security mode by using the above-described operations.

Figure 9:
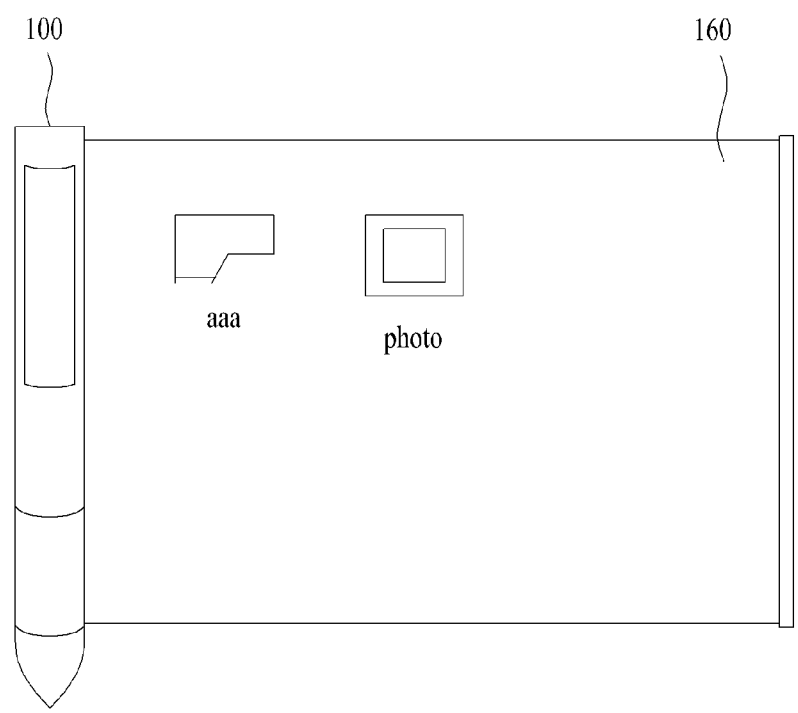
FIG. 9 illustrates a process of releasing (or cancelling) first security settings according to an exemplary embodiment.

FIG. 9 illustrates a process of releasing (or cancelling) first security settings according to an exemplary embodiment.

Referring to FIG. 9(a), a Primary Security Cancel mode is illustrated. Herein, an exemplary embodiment wherein a finger of the user is contacting the grip unit 120 of the terminal device 100 is shown in FIG. 9(a). The grip unit 120 of the terminal device 100 may further include a fingerprint recognition sensor. Accordingly, the terminal device 100 may recognize a fingerprint of the contacting finger. According to the exemplary embodiment, the terminal device 100 may set up the Security Cancel mode to three different types. Herein, the three different types of Security Cancel modes may include a Primary Security Cancel mode, a Secondary Security Cancel mode, and a Temporary Security Cancel mode.

The Primary Security Cancel mode corresponds to a mode that cancels the security settings by recognizing the user's fingerprint. Herein, the terminal device 100 may configure the settings by receiving in advance the fingerprint that is to be used for cancelling the security settings. When the fingerprint that is to be used for cancelling the security settings is recognized, the terminal device 100 may compare the fingerprint that is being inputted through the grip unit 120 with the predetermined fingerprint. Thereafter, if the inputted fingerprint matches with the predetermined fingerprint, the terminal device 100 may cancel the primary security settings and may then execute the Primary Security Cancel mode.

FIG. 9(b) illustrates a display screen wherein the Primary Security Cancel mode is being executed. For example, the Primary Security Cancel mode may refer to a mode that can execute most of the general functions of the terminal device 100. For example, the terminal device 100 may perform functions, such as carrying out phone conversations, functioning as a camera, establishing connection with the Internet, and so on, and the terminal device 100 may also display document folders, image folders, and so on, through the rollable display unit 160.

Figure 10:
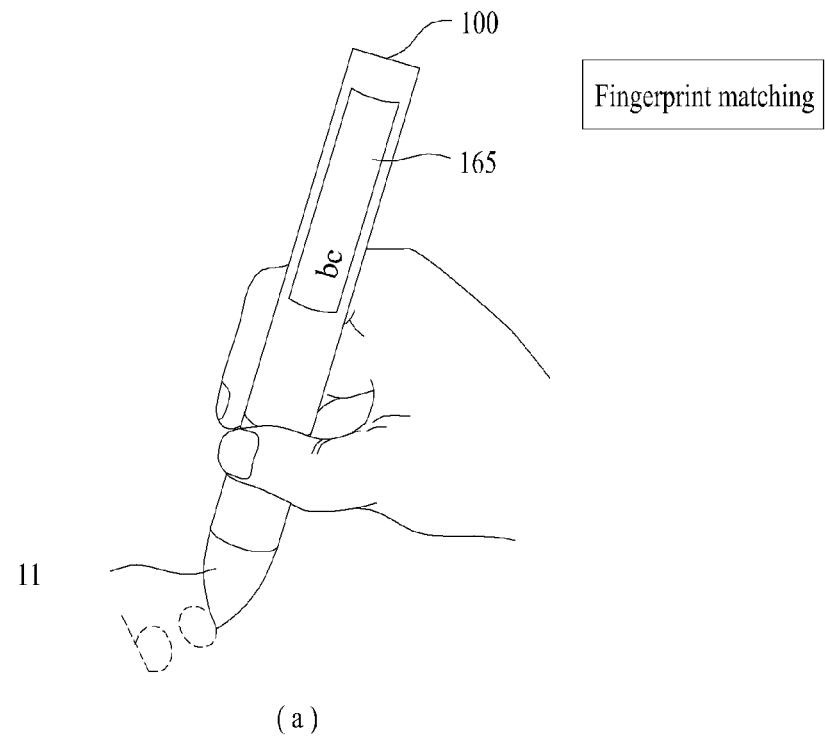
FIG. 10 illustrates a process of releasing (or cancelling) second security settings according to an exemplary embodiment.
Figure 10:
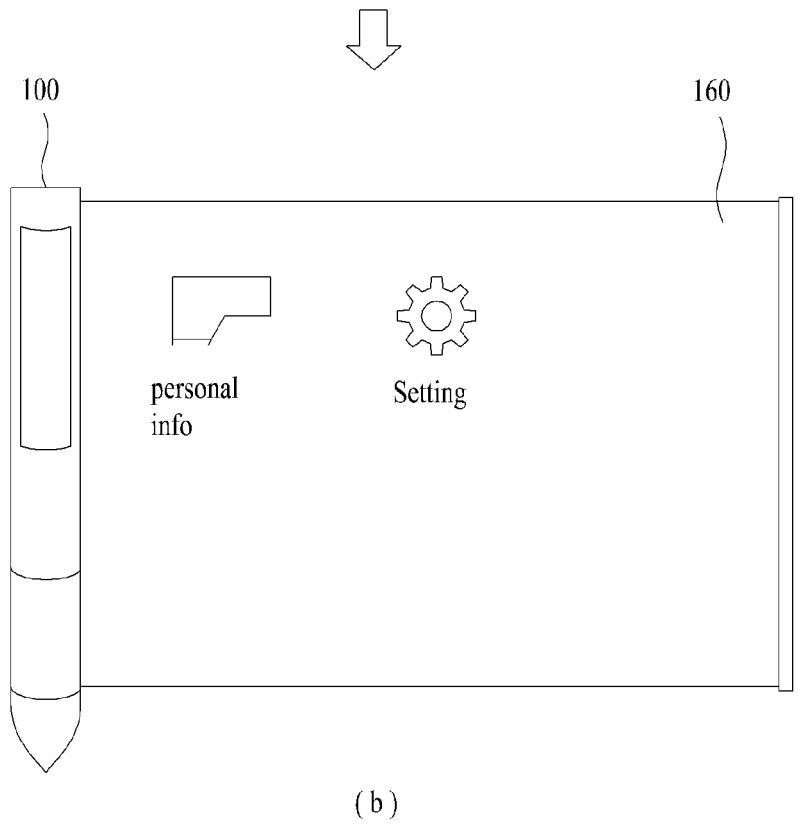

FIG. 10 illustrates a process of releasing (or cancelling) second security settings according to an exemplary embodiment.

Referring to FIG. 10(a), a Secondary Security Cancel mode is illustrated. The Secondary Security Cancel mode corresponds to a mode that can cancel the security settings by recognizing a fingerprint and a signature. More specifically, the Secondary Security Cancel mode may refer to a mode that can cancel two different steps of security settings. The user may perform handwriting by gripping the terminal device 100. The grip unit 120 may include a fingerprint recognition sensor, thereby being capable of receiving the user's fingerprint(s) from the contacting finger(s) of the user. The terminal device 100 may compare the inputted fingerprint(s) with the predetermined fingerprint(s). If the inputted fingerprint matches with the predetermined fingerprint, the terminal device 100 may primarily cancel the primary security settings.

The terminal device 100 may move in accordance with the handwriting of the user. The terminal device 100 may recognize a signature of the user by recognizing the movement of the terminal device 100. The terminal device 100 may configure the settings by receiving in advance the signature that is to be used for cancelling the security settings. When the signature of the user that is to be used for cancelling the security settings is recognized, the terminal device 100 may compare the recognized signature with the predetermined signature. Thereafter, if the recognized signature matches with the predetermined signature, the terminal device 100 may cancel the secondary security settings and may then execute the Secondary Security Cancel mode. Meanwhile, the sub display unit 165 may display the recognized signature of the user for a predetermined period of time.

FIG. 10(b) illustrates a display screen wherein the Secondary Security Cancel mode is being executed. For example, the Secondary Security Cancel mode may refer to a mode that can perform personal and secretive functions of the terminal device 100. For example, the terminal device 100 may perform functions, such as environment set-up, personal information input, authentication certificate management, and so on. And, the terminal device 100 may display a folder, such as personal photos, diary, and so on. Alternatively, the terminal device 100 may display a function or folder being configured with the Secondary Security settings by the user.

Figure 11:
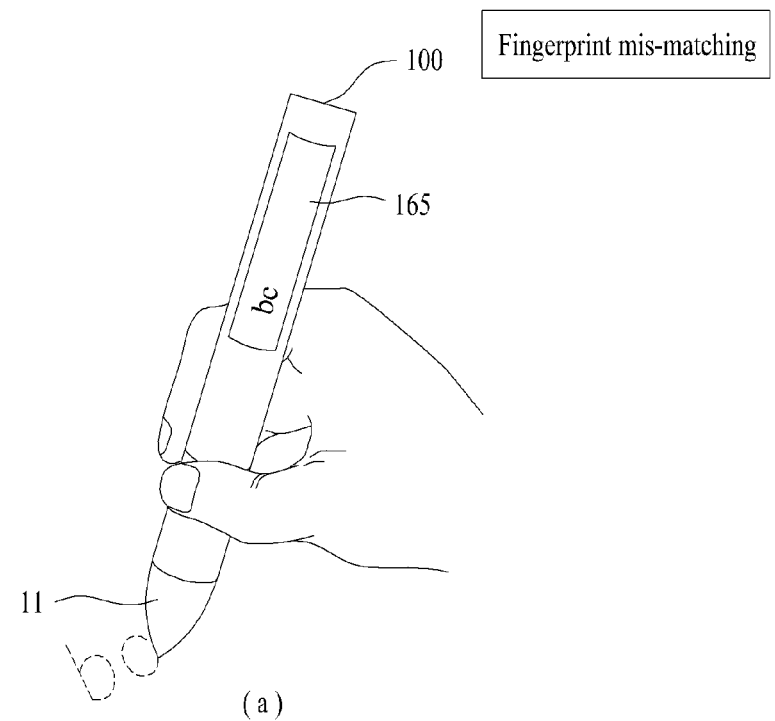
FIG. 11 illustrates a process of executing a temporary unlock mode according to an exemplary embodiment.
Figure 11:
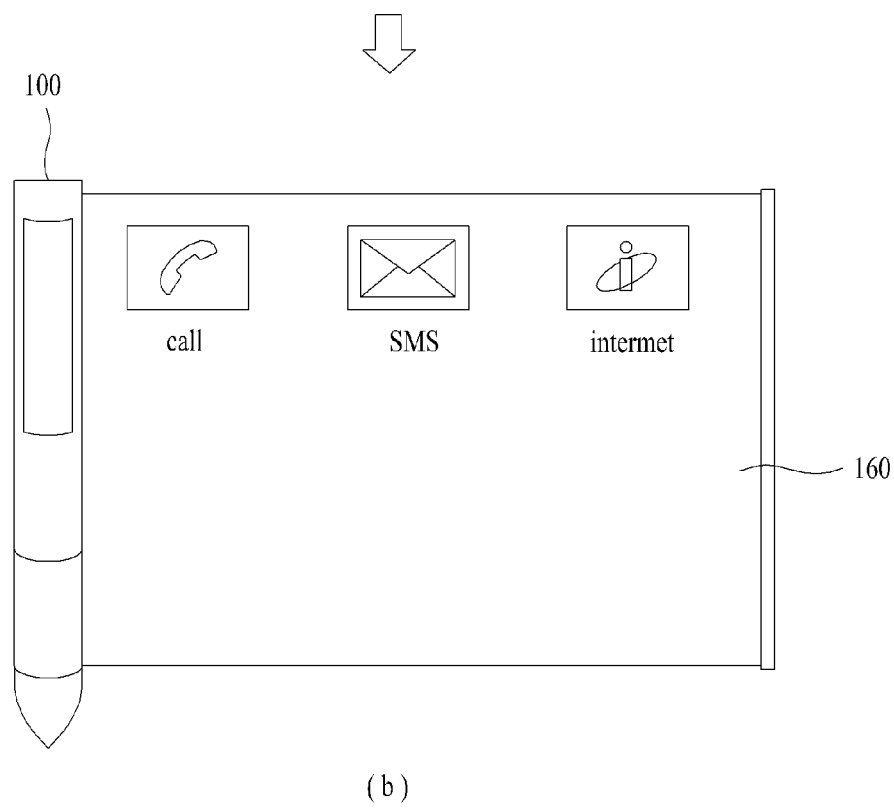

FIG. 11 illustrates a process of executing a temporary unlock mode according to an exemplary embodiment.

Referring to FIG. 11(a), the Temporary Security Cancel mode is illustrated. Herein, the Temporary Security Cancel mode corresponds to a mode that can cancel security settings by recognizing a signature. Generally, the user may allow the terminal device 100 to recognize his (or her) fingerprint. And, the user may also allow the terminal device 100 to recognize the fingerprints of only a limited number of other individuals or may block the recognition of the fingerprints belonging to any other individual. However, inevitable instances when other individuals are required to use the user's terminal device 100 may frequently occur. Accordingly, the Temporary Security Cancel mode may refer to a mode for cancelling function-limited security settings by recognizing a simple signature.

The user may perform handwriting by using the terminal device 100. The user's fingerprint that is shown in FIG. 11(a) does not match with the fingerprint that is predetermined in the terminal device 100. Therefore, the terminal device 100 does not cancel the primary security settings. The terminal device 100 may move in accordance with the user's handwriting. The terminal device 100 may recognize a signature of the user by recognizing the movement of the terminal device 100. When the terminal device 100 recognizes the user's signature, the terminal device 100 may compare the recognized signature with the predetermined signature. When the recognized signature, which is recognized in a state when the recognized fingerprint does not match with the predetermined fingerprint, matches with the predetermined signature, the terminal device 100 may execute the Temporary Security Cancel mode. The signature that can execute the Temporary Security Cancel mode may be identical to or different from the signature that can execute the Secondary Security Cancel mode, which is described above with reference to FIG. 10. Meanwhile, the sub display unit 165 may display the recognized signature of the user for a predetermined period of time.

FIG. 11(b) illustrates a display screen wherein the Temporary Security Cancel mode is being executed. For example, the Temporary Security Cancel mode may refer to ca mode that can execute minimum functions of the terminal device 100. For example, the terminal device 100 may perform functions, such as carrying out phone calls, sending and receiving short message service (SMS), establishing Internet connection, and so on, and the terminal device 100 may display folders that are related to the functions, which can be executed by the terminal device 100, on the rollable display unit 160. Alternatively, the user may set up functions that can be executed (or functions that are available for execution) in the Temporary Security Cancel mode. In this case, the terminal device 100 may only execute the configured functions.

The terminal device 100 may set up multiple security cancel modes based upon the fingerprint and signature. Additionally, the terminal device 100 may execute diverse authentication processes based upon the fingerprint and signature.

Figure 12:
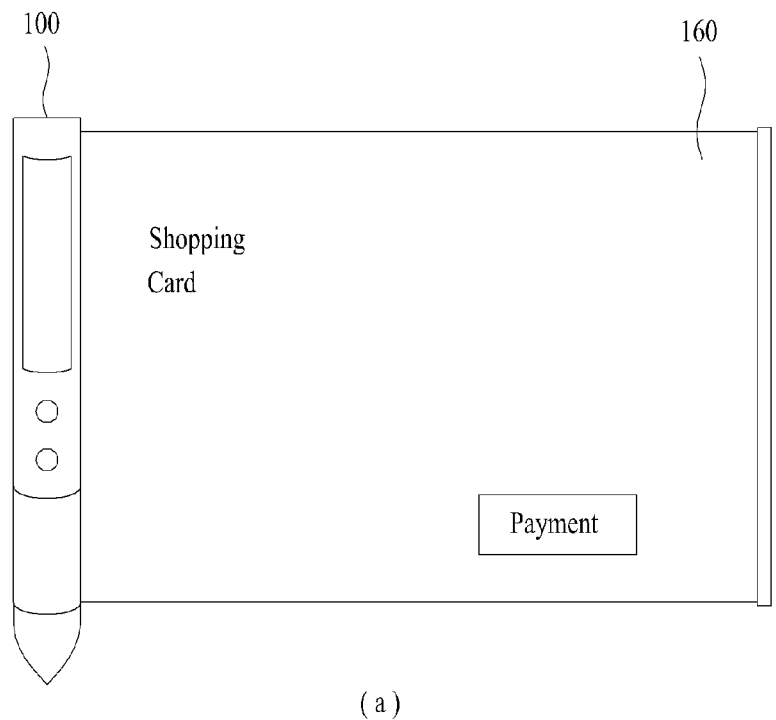
FIG. 12 illustrates a user authentication process according to an exemplary embodiment.
Figure 12:
Figure 12:
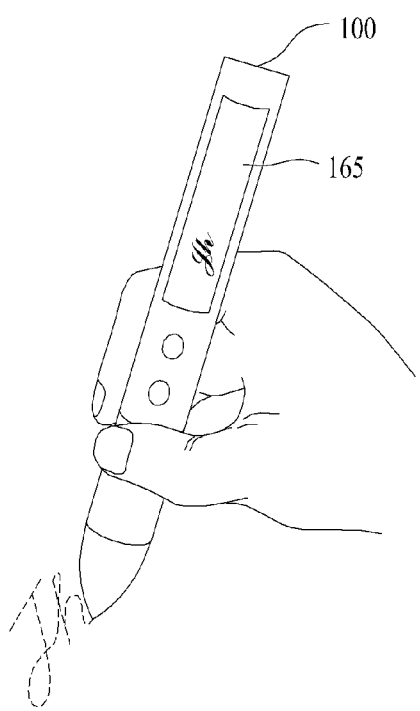

FIG. 12 illustrates a user authentication process according to an exemplary embodiment.

Referring to FIG. 12(a), a terminal device 100 wherein a payment service is being executed is illustrated. The terminal device 100 may execute a safe payment service by using the fingerprint and signature functions. The terminal device 100 may display services related to shopping and payment on the rollable display unit 160. The terminal device 100 may be shifted to the Electronic Pen mode in order to perform user authentication and payment processes.

FIG. 12(b) illustrates the terminal device 100 performing payment while being operated in the Electronic Pen mode. In case the rollable display unit 160 is stored, and in case a contact state detected by the grip unit matches with the predetermined contact state, the terminal device 100 may execute the Electronic Pen mode. Herein, the grip unit may include a fingerprint recognition sensor. Thereafter, the terminal device 100 may receive in advance a fingerprint, so as to configure the settings. When a fingerprint is recognized by the grip unit, the terminal device 100 may compare the recognized fingerprint with the predetermined fingerprint. If the recognized fingerprint matches with the predetermined fingerprint, the terminal device 100 may transmit the recognized fingerprint to a server for performing payment. By transmitting the recognized fingerprint in accordance with the security or payment method of the server, the terminal device 100 may complete the payment process.

The payment method of the server may additionally request a signature. The user may perform handwriting by using the terminal device 100. The terminal device 100 may move in accordance with the handwriting of the user. The terminal device 100 may recognize a signature of the user by recognizing the movement of the terminal device 100. When the terminal device 100 recognizes the user's signature, the terminal device 100 may compare the recognized signature with the predetermined signature. Thereafter, if the recognized signature matches with the predetermined signature, the terminal device 100 may transmit the recognized signature to the payment server. Meanwhile, the sub display unit 165 may display the recognized signature of the user for a predetermined period of time.

According to another exemplary embodiment, the payment server may only request a signature as a method for performing payment. The terminal device 100 may transmit a signature to the payment server, only when the recognized fingerprint and the recognized signature respectively match with the predetermined fingerprint and the predetermined signature. In case the recognized fingerprint does not match with the predetermined fingerprint, or in case the recognized signature does not match with the predetermined signature, the terminal device 100 may perform a safe payment service by not transmitting the recognized signature.

The payment service described with reference to FIG. 12 is merely an exemplary embodiment of an authentication method, and, therefore, the terminal device 100 may perform diverse authentication processes by using the above-described methods. More specifically, after the authentication screen is displayed on the rollable display unit 160, while the terminal device 100 is being operated in the Display mode, the rollable display unit 160 may be stored in the housing. In case the contact state detected by the grip unit matches with the predetermined contact state, the terminal device 100 may execute the Electronic Pen mode. In case the fingerprint that is being inputted through the grip unit 120 matches with the predetermined fingerprint, and in case the recognized signature, which is detected based upon a signal being detected in accordance with the movement of the terminal device 100, matches with the predetermined signature, the terminal device 100 may perform the authentication process.

Figure 13:
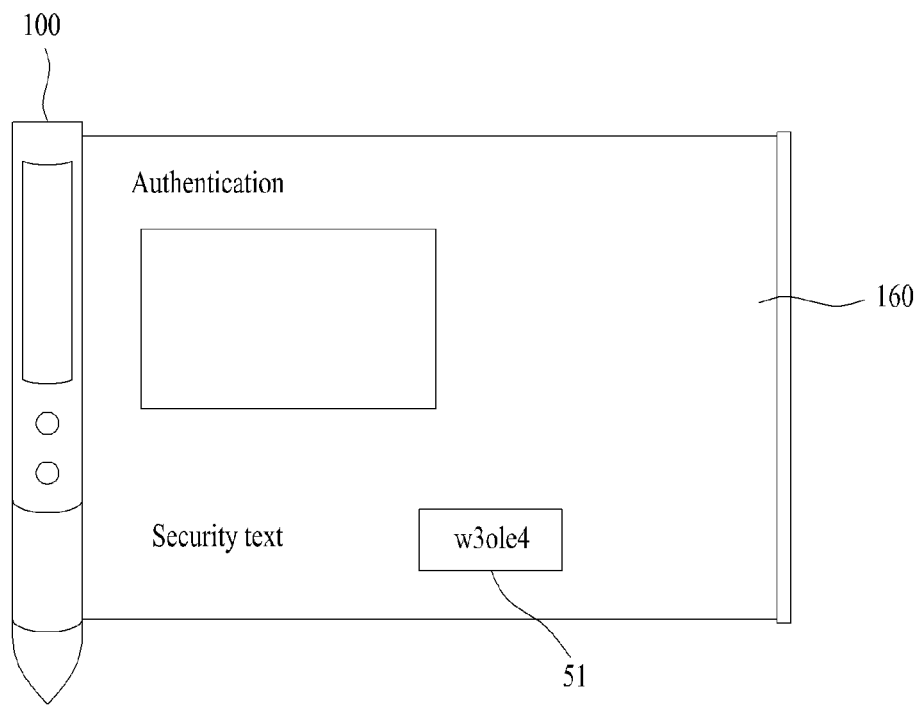
FIG. 13 illustrates a user authentication process according to another exemplary embodiment.
Figure 13:
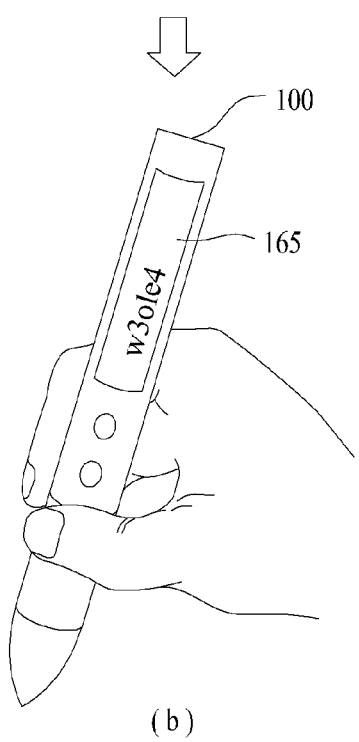

FIG. 13 illustrates a user authentication process according to another exemplary embodiment.

Referring to FIG. 13(*a*), an exemplary embodiment of an authentication screen is illustrated. As described above, diverse authentication methods may be used. According to an exemplary embodiment, some websites may receive security texts in order to perform subscription or log-in (or sign-in). A screen receiving the signature and the security text is shown in the rollable display unit 160. The rollable display unit 160 may be stored inside the terminal device 100.

FIG. 13(*b*) illustrates the terminal device 100 performing authentication in the Electronic Pen mode. The terminal device 100 may receive the user's fingerprint through the grip unit 120. The terminal device 100 may compare the inputted fingerprint with the predetermined fingerprint. If the inputted fingerprint matches with the predetermined fingerprint, the terminal device 100 may receive a signature. During the process of performing authentication, if the inputted fingerprint does not match with the predetermined fingerprint, the terminal device 100 may output a notification signal. For example, the notification signal may correspond to a sound, and the notification signal may also correspond to a message output or a blinking signal displayed (or indicated) through the sub display unit 165.

When a security text exists, the terminal device 100 may display the security text on the sub display unit 165. The security text may refer to a combination of texts (or letters) requested to the user in order to prevent any automatic subscription from occurring. Therefore, since the user cannot see the security text when the terminal device 100 is being operated in the Electronic Pen mode, the terminal device 100 may display the security text on the sub display unit 165. The user may perform handwriting by using the terminal device 100. The terminal device 100 may move in accordance with the handwriting of the user. The terminal device 100 may recognize the handwriting of the user by recognizing the movement of the terminal device 100. When the terminal device 100 recognizes the user's handwriting, the terminal device 100 may compare the recognized handwriting with the security text. Thereafter, if the recognized handwriting matches with the security text, the terminal device 100 may complete the authentication process. Meanwhile, if the recognized handwriting does not match with the security text, the terminal device 100 may output a notification signal.

Presented above are diverse exemplary embodiments of the terminal device 100 being operated in the Display mode and Electronic Pen mode. The rollable display unit 160 of the terminal device 100 may be separated (or detached) from the housing of the terminal device 100. An exemplary embodiment of the detached terminal device 100 will hereinafter be described in detail.

Figure 14:
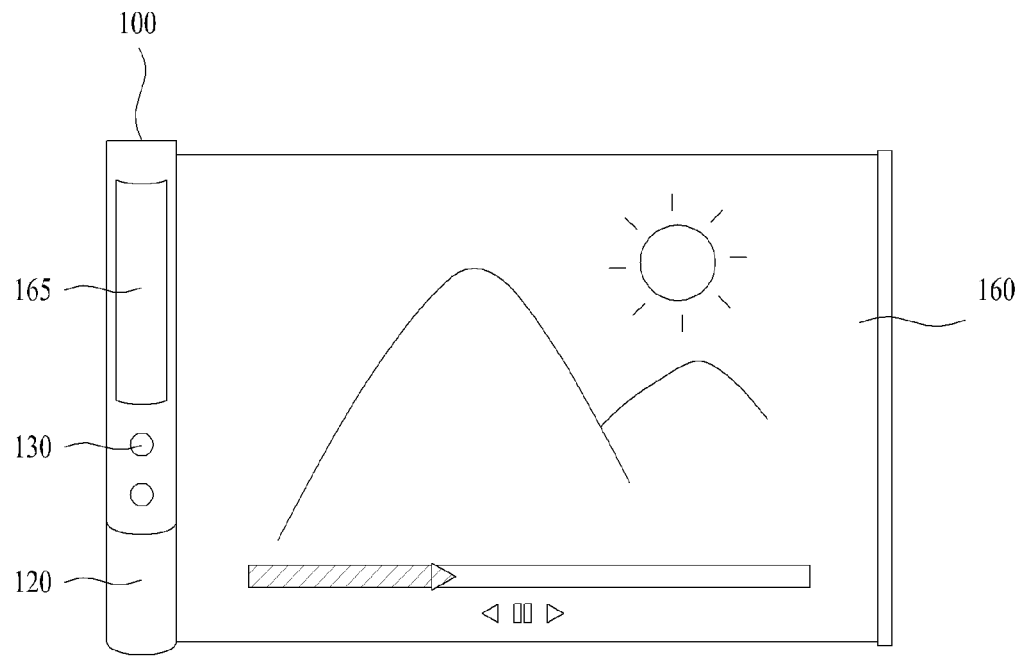
FIG. 14 illustrates a terminal device being detached (or separated) from a flexible device according to an exemplary embodiment.
Figure 14:
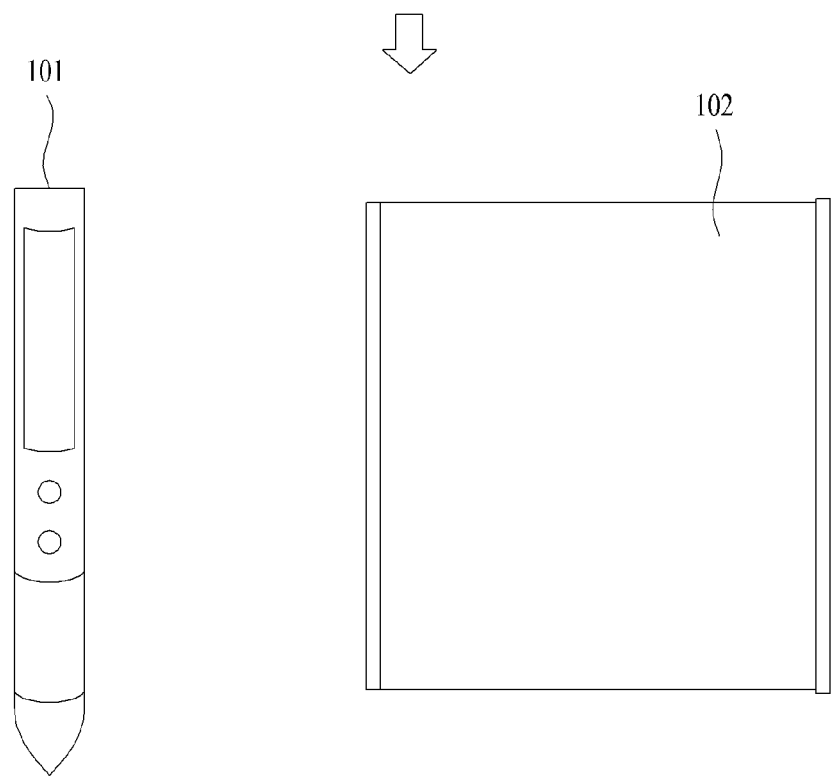

FIG. 14 illustrates a terminal device being detached (or separated) from a flexible device according to an exemplary embodiment.

Referring to FIG. 14(*a*), the terminal device 100 being operated in the Display mode is illustrated. The terminal device 100 may include a grip unit 120, an input unit 130, and a sub display unit 165. As described above, the grip unit 120 may also include a fingerprint recognition sensor. Additionally, the input unit 130 may be implemented as a single body with the sub display unit 165, and the input unit 130 may be positioned above the sub display unit 165. The terminal device 100 may also include a tip. However, the tip may be inserted inside the housing of the terminal device 100, when the terminal device 100 is being operated in the Display mode. In case the rollable display unit 160 is detached, or in case the rollable display unit 160 is stored in the housing, the tip may be exposed outside of the housing. The rollable display unit 160 may be separated (or detached) from the terminal device 100.

FIG. 14(*b*) illustrates a detached terminal device 100. When the rollable display unit 160 is detached from the terminal device 100, each part may be operated as an independent electronic device. In this specification, the part including the housing and the sub display unit 165 will be referred to as a main terminal device 101, and the part including the rollable display unit 160 will be referred to as a flexible terminal device 102.

The main terminal device 101 may include all configuration units (or parts) excluding the rollable display unit 160. The flexible terminal device 102 may include a touch sensor, thereby being capable of receiving a touch input. A communication unit, an audio unit, a storage unit, and a power unit may be included in one area of the flexible terminal device 102. However, each of the elements configuring the flexible terminal device 102 may include a module performing minimum functions. While the flexible terminal device 102 is being connected to the main terminal device 101, the flexible terminal device 102 may be supplied with power from the main terminal device 101, and the flexible terminal device 102 may use an independent power module only when detached from the main terminal device 101. A portion of the main terminal device 101 and a portion of the flexible terminal device 101 may each be implemented as a connector for establishing electrical and mechanical connection to one another.

Figure 15:
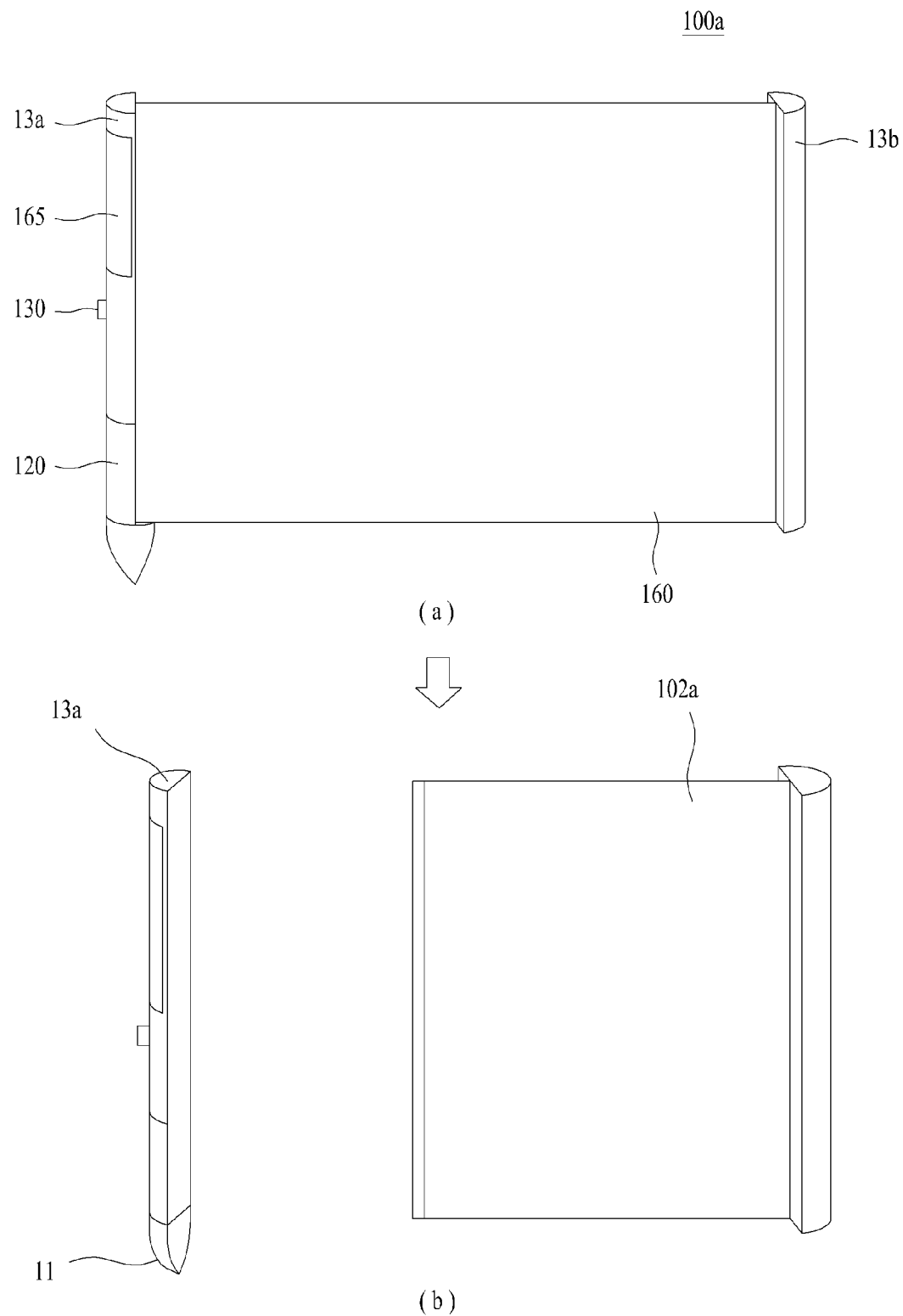
FIG. 15 illustrates a terminal device being detached (or separated) from a flexible device according to another exemplary embodiment.

FIG. 15 illustrates a terminal device being detached (or separated) from a flexible device according to another exemplary embodiment.

Referring to FIG. 15(*a*), a terminal device 100*a* according to another exemplary embodiment is illustrated. The terminal device 100*a* may include two parts: a first part 13*a* and a second part 13*b*. In the Display mode, the first part 13*a* may be detached from the second part 13*b*. The rollable display unit 160 may be connected to the first part 13*a* and the second part 13*b*. The terminal device 100 may be implemented as a fixed protrusion protruding outside of the terminal device 100. A portion of the first part 13*a* or a portion of the second part 13*b* may be detached (or separated) from the rollable display unit 160.

FIG. 15(*b*) illustrates a detached terminal device 100. FIG. 15(*b*) shows the first part 13*a* being detached from the rollable display unit 160. However, the rollable display unit 160 may also be connected to the first part 13*a* while being detached from the second part 13*b*. As described above, when the terminal device 100 is detached from the rollable display unit 160, each part may be operated as an independent electronic device. Herein, the part including the housing and the sub display unit 165 will be referred to as a main terminal device 13*a*, and the part including the rollable display unit 160 will be referred to as a flexible terminal device 13*b*.

A difference between the terminal device 100*a* of FIG. 15 and the terminal device 100 of FIG. 14 is that the terminal device 100*a* of FIG. 15 includes a first part 13*a* and a second part 13*b*, and that the first part 13*a* and the second part 13*b* can be detached from one another. Since the rest of the configuration (or structure) is identical to the terminal device 100 of FIG. 14, detailed description of the same will be omitted for simplicity.

Figure 16:
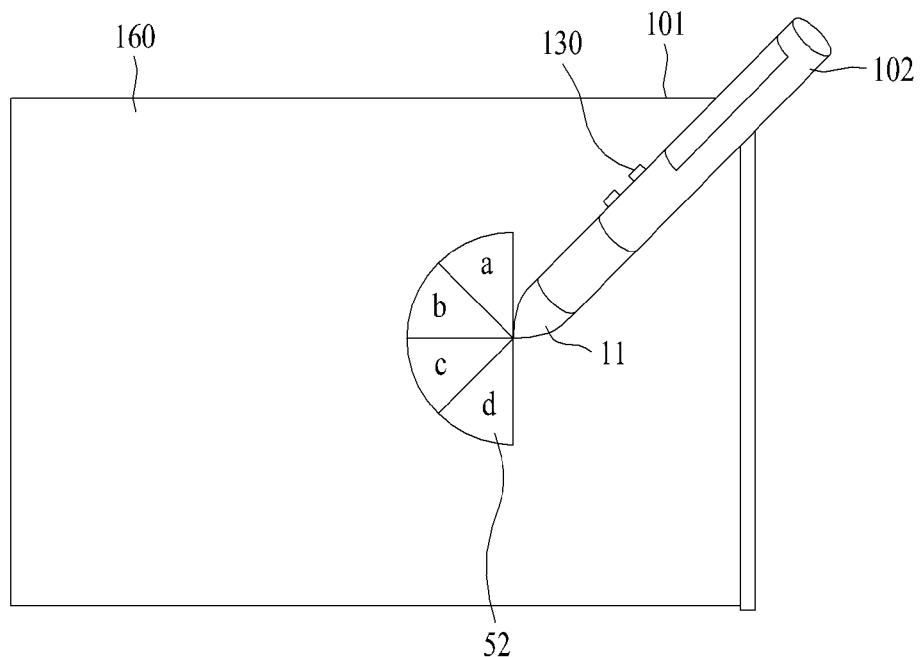
FIG. 16 illustrates a first exemplary embodiment of a user terminal being detached from a terminal device.

FIG. 16 illustrates a first exemplary embodiment of a user terminal being detached from a terminal device.

Referring to FIG. 16, the main terminal device 101 and the flexible terminal device 102 are illustrated. A display unit 160 of the flexible terminal device 102 may recognize an approach of the main terminal device 101. When the flexible terminal device 102 recognizes the approach of the main terminal device 101, the flexible terminal device 102 may perform predetermined operations. For example, the flexible terminal device 102 may display a menu at a location where the approach of the main terminal device 102 has been recognized.

The flexible terminal device 102 may recognize the approach of the main terminal device 101 by using diverse methods. For example, the flexible terminal device 102 and a tip 11 of the main terminal device 101 may include a module that is configured to perform electromagnetic induction. When the tip 11 approaches the flexible terminal device 102, an electromagnetic induction effect may occur. Due to the electromagnetic induction effect, electrical currents may flow to the flexible terminal device 102. Therefore, the flexible terminal device 102 may recognize the approach of the main terminal device 101 and may then display a menu 52.

Alternatively, the flexible terminal device 102 may include a touch sensor. The main terminal device 101 may touch the flexible terminal device 102. The flexible terminal device 102 may detect a touch point of the main terminal device 101. The input unit 130 of the main terminal device 101 may include a menu key. When the main terminal device 101 touches the flexible terminal device 102, and when a menu key is selected, the main terminal device 101 may transmit a Display Menu command to the flexible terminal device 102. The flexible terminal device 102 may display a menu 52 on the touch point of the main terminal device 101.

Alternatively, the flexible terminal device 102 may include a proximity sensor. The proximity sensor may recognize the approach of the main terminal device 101. When the main terminal device 101 transmits a Display Menu command to the flexible terminal device 102, the flexible terminal device 102 may display a menu 52 on a point where the approach of the main terminal device 101 is recognized.

Herein, the menu display is merely an exemplary embodiment, and, therefore, the flexible terminal device 102 may perform diverse functions, such as select, copy, display related information, and so on.

Figure 17:
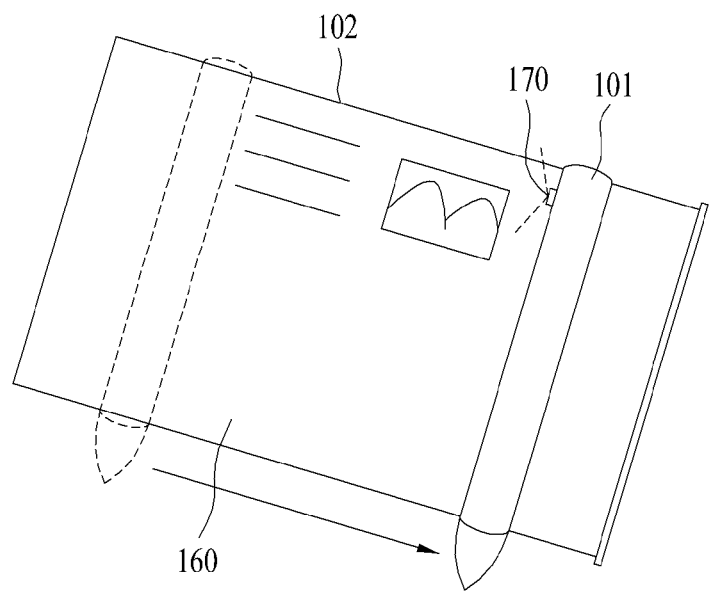
FIG. 17 illustrates a second exemplary embodiment of a user terminal being detached from a terminal device.

FIG. 17 illustrates a second exemplary embodiment of a user terminal being detached from a terminal device.

Referring to FIG. 17, the main terminal device 101 is scanning a content that is displayed on the flexible terminal device 102. The main terminal device 101 may include a Scan menu. When the Scan menu is selected, the main terminal device 101 may turn on a camera. As the main terminal device 101 moves above the display unit of the flexible terminal device 102 from a left side of the flexible terminal device 102 to the right side of the flexible terminal device 102, the main terminal device 101 may capture (or film or video-record) a content that is being displayed by the flexible terminal device 102. For example, the main terminal device 101 may capture (or video-record) the content being displayed by the flexible terminal device 102 by using a method similar to a Panorama mode. The main terminal device 101 may create a scan file by creating an image from the video-recorded content. Additionally, the main terminal device 101 may either recognize a text from the created scan file or may also recognize an image from the created scan file.

Meanwhile, the main terminal device 101 may display a notification, which allows a constant distance to be maintained between the main terminal device 101 and the display unit of the flexible terminal device 102, and which allows the main terminal device 101 to move at a constant speed. For example, the main terminal device 101 may display a movement speed and a distance between the main terminal device 101 and the flexible terminal device 102 on the sub display unit. Alternatively, the main terminal device 101 may indicate (or display) an initial movement speed and a change in the distance between the flexible terminal device 102 and the main terminal device 101 by using methods, such as a sound, a blinking signal, and so on. According to an exemplary embodiment, in case the main terminal device 101 moves at a constant speed, a constant cycle period (or interval) of the sound may be outputted, and a fast cycle period of the sound may be outputted as the movement speed of the main terminal device 101 becomes faster, and a slow cycle period of the sound may be outputted as the movement speed of the main terminal device 101 becomes slower. According to another exemplary embodiment, when the main terminal device 101 maintains a predetermined distance between the main terminal device 101 and the flexible terminal device 102, a turned on state of an LED may be maintained. However, when the distance between the main terminal device 101 and the flexible terminal device 102 becomes larger, the LED may blink at a shorter cycle period, and when the distance between the main terminal device 101 and the flexible terminal device 102 becomes smaller, the LED may blink at a faster cycle period.

Figure 18:
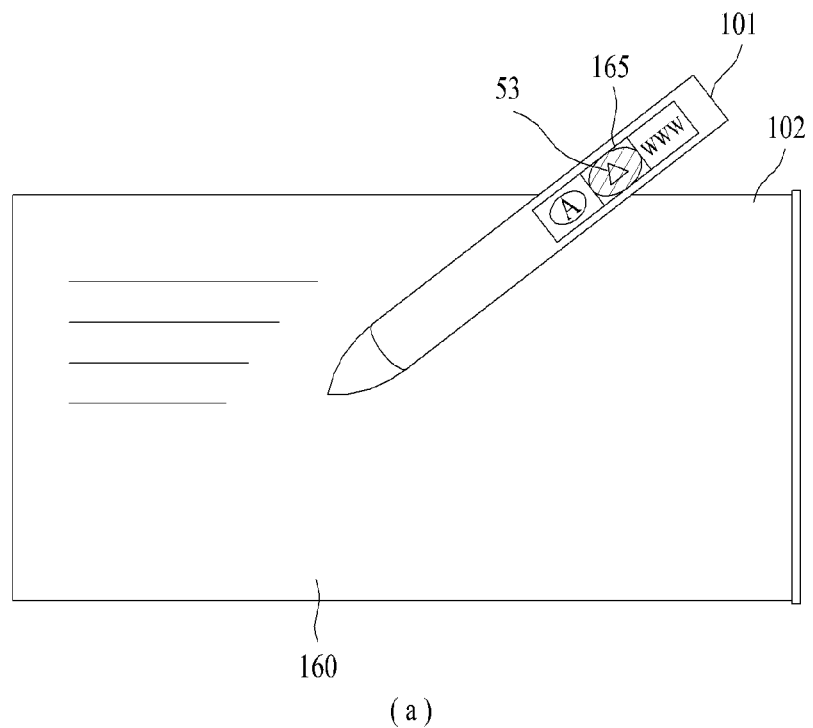
FIG. 18 illustrates a third exemplary embodiment of a user terminal being detached from a terminal device.
Figure 18:
Figure 18:
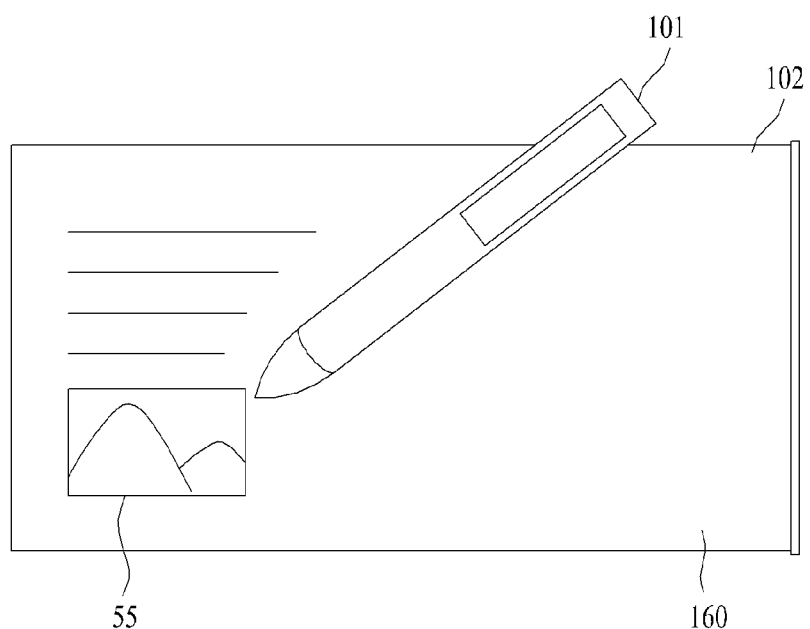

FIG. 18 illustrates a third exemplary embodiment of a user terminal being detached from a terminal device.

Referring to FIG. 18(*a*), the flexible terminal device 102 and the main terminal device 101 copying a displayed content are illustrated. The main terminal device 101 may copy or cut the content that is displayed on the display unit 160 of the flexible terminal device 102. Alternatively, the main terminal device 101 may scan the content that is displayed on the flexible terminal device 102. Herein, the content may correspond to one file, or the content may also correspond to one word or one image.

The main terminal device 101 may identify an image and a text from the scanned content. The main terminal device 101 may display a menu, which is configured to select a type of the stored content in accordance with a Load command, on the sub display unit 165. For example, a Select menu may include a text, an image, a URL address, and so on. When the main terminal device 101 receives a Select Content command, the main terminal device 101 may transmit the selected content to the flexible terminal device 102. For example, as shown in FIG. 18(*a*), an Image menu 53 may be selected. The main terminal device 101 may transmit a currently stored image to the flexible terminal device 102.

Referring to FIG. 18(*b*), the flexible terminal device 102 displaying the selected image is illustrated. When the main terminal device 101 approaches or touches the display unit 160 of the main terminal device 101, the flexible terminal device 102 may recognize a point of approach or touch of the main terminal device 101. The flexible terminal device 102 may display an image 55 on the recognized point.

Presented above are diverse exemplary embodiments of the terminal device. A method for controlling the terminal device will hereinafter be described in detail.

Figure 19:
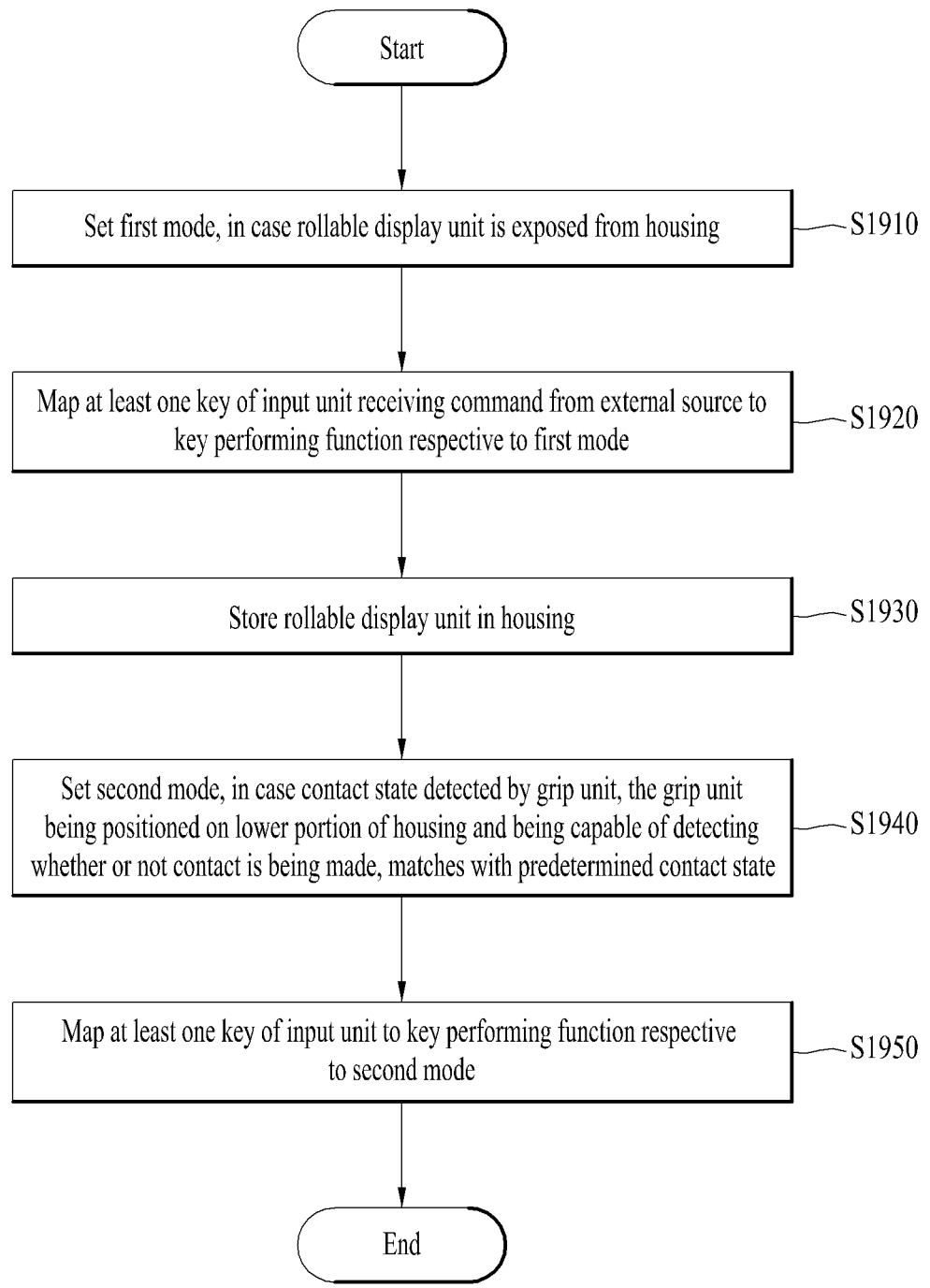
FIG. 19 illustrates a flow chart of a method for controlling a terminal device according to an exemplary embodiment.

FIG. 19 illustrates a flow chart of a method for controlling a terminal device according to an exemplary embodiment.

According to FIG. 19, in case the rollable display unit is exposed from the housing of the terminal device, the terminal device may be set to a Display mode (S1910). The housing may be implemented in the form of a pillar. The rollable display unit may be exposed to the outside from one side of the housing. The Display mode may refer to a mode wherein the rollable display unit is unrolled (or spread out) and, wherein an image, and so on, is being displayed on the rollable display unit.

The terminal device may map at least one key of an input unit, which receives a command from an external source, to a key that is configured to perform a function respective to the Display mode (S1920). The terminal device may include a sun display unit. The input unit may be configured separately from the sub display unit, or may be formed as a single body with the sub display unit. A key of the input unit may be implemented as a physical button, a soft key, a touch pad, a touch screen, and so on. For example, the terminal device may map a key of the input unit to a Home key, which is configured to shift to a Home screen in the Display mode.

The rollable display unit of the terminal device may be stored in the housing (S1930). The rollable display unit may be automatically stored due to an elastic force. Alternatively, the terminal device may include an axis, which is configured to roll the rollable display unit inside the housing. A portion of the rolling axis may be exposed outside of the terminal device, or a rotatable part, which is configured to be connected to the rolling axis, may be included on the outside of the terminal device. When the rolling axis, which is partially exposed to the outside of the housing, or the rotatable part provided on the outside of the housing is rotated along a predetermined direction, the rollable display unit may be stored in the housing.

The terminal device may be provided with a grip unit, which is configured to be positioned on a lower portion of the housing and to detect whether or not a contact is being made, and when a contact state detected by the grip unit matches with a predetermined contact state, the terminal device may be set to the Electronic Pen mode (S1940). The grip unit may detect a contact state of the user. The grip unit may be positioned above the tip of the terminal device. Additionally, the grip unit may include a fingerprint recognition sensor, so as to be capable of recognizing fingerprints. The Electronic Pen mode may refer to a mode wherein the terminal device 100 has a form that is similar to a pen, and wherein handwriting operations may be performed.

The terminal device may map at least one key of the input unit to a key that is configured to perform a function respective to the Electronic Pen mode (S1950). According to an exemplary embodiment, the terminal device may map a key, which is mapped to the Home key in the Display mode, to a key that is configured to perform a Send (or Transmit) function or to a key that is configured to perform an End function. The function mapped to each key is merely exemplary, and, therefore, more diverse functions may be mapped.

As described above, the terminal device and the method for controlling the same have the following advantages. According to the above-described diverse exemplary embodiments, the terminal device and the method for controlling the same may be used in diverse mode depending upon whether or not a predetermined condition is being met. Additionally, the terminal device and the method for controlling dame may map the same key to perform different functions. Moreover, the terminal device and the method for controlling the same may easily perform a Recording mode.

Additionally, the terminal device and the method for controlling the same may conveniently transmit a message to an opposite party or may store the message. Moreover, the terminal device and the method for controlling the same may set up a Security mode in multiple steps. Furthermore, the terminal device and the method for controlling the same may conveniently perform a user authentication process.

The terminal device and the method for controlling the same according to this specification may not be limited only to the above-described configuration and methods according to the exemplary embodiments of this specification. Accordingly, variations of the exemplary embodiments of this specification may be configured by selectively combining each exemplary embodiment of this specification fully or in part.

Meanwhile, the terminal device and the method for controlling the same according to this specification may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

What is claimed is:

1. A terminal device comprising a pillar-shaped housing, the terminal device comprises:
    a communication unit configured to perform communication with an external target;
    a rollable display unit configured to be stored in the housing and to be exposed from the housing;
    a sub display unit configured to be positioned on a portion of the housing;
    a grip unit configured to be positioned on a lower portion of the housing and to detect whether or not a contact is being made;
    a sensor unit configured to detect a movement of the terminal device;
    an input unit configured to receive commands from an external source; and
    a controller,
    wherein the controller is configured:
    to set up a first mode, in case the rollable display unit is exposed from the housing, wherein at least one key of the input unit is mapped to a key configured to perform a function respective to the first mode, and
    to set up a second mode, in case the rollable display unit is stored in the housing, and in case a contact state detected by the grip unit matches with a predetermined contact state, wherein at least one key of the input unit is mapped to a key configured to perform a function respective to the second mode.

2. The terminal device of claim 1, wherein the housing is configured of a first part and a second part both being detachable from one another along left-to-right directions based upon a major axis,
    wherein, in case the first part and the second part are detached from one another so as to be spread out, and wherein the rollable display unit being stored in at least one of the first part and the second part is exposed, and
    wherein, in case the first part and the second part are reunited, the rollable display unit is stored in at least one of the first part and the second part.

3. The terminal device of claim 1, wherein the controller maps at least one key of the input unit to a Home key in the first mode, and to a Send key in the second mode.

4. The terminal device of claim 1, wherein, when an incoming call is received in the second mode, the controller recognizes a message based upon a signal detected by the sensor unit in accordance with a movement of the terminal device, and wherein, when a Reject Call command is received, the controller controls the communication unit so as to transmit the recognized message to an opposite party.

5. The terminal device of claim 4, wherein the controller controls the sub display unit so as to display the recognized message.

6. The terminal device of claim 1, wherein, when an incoming call is received in the second mode, and in case a lower end portion of the housing is contacted with an object for a predetermined period of time or more, the controller activates a Speaker Phone function.

7. The terminal device of claim 6, wherein the controller recognizes a message based upon a signal detected by the sensor unit in accordance with the movement of the terminal device, and wherein the controller executes a Recording mode configured to store the recognized message along with a call information.

8. The terminal device of claim 7, wherein, in case a Send command is received, the controller controls the communication unit so as to transmit the recognized message to the opposite party.

9. The terminal device of claim 7, wherein, when the Recording mode is being executed, and in case a lower end portion of the housing is contacted with an object for a predetermined period of time or more, the controller stops the Recording mode.

10. The terminal device of claim 7, wherein, when a call is ended, and in case the rollable display unit is exposed from the housing, the controller controls the rollable display unit so as to display the recognized message along with the call information.

11. The terminal device of claim 10, wherein the call information includes at least one of a call reception time, a phone call time, a sender, a recording time of the recognized message, and a voice-recording file of a phone call.

12. The terminal device of claim 1, further comprising:
    a camera unit, and
    wherein, when an incoming call is received in the second mode, and in case the rollable display unit is exposed from the housing, the controller activates a Video Phone function.

13. The terminal device of claim 12, wherein, in case the rollable display unit is stored in the housing, the controller controls the sub display unit so as to display an image of the opposite party.

14. The terminal device of claim 13, wherein, in case a contact state detected by the grip unit matches with a predetermined contact state, the controller recognizes a message based upon a signal detected by the sensor unit in accordance with a movement of the terminal device, and wherein, in case a Send command is received, the controller controls the communication unit so as to transmit the recognized message to the opposite party.

15. The terminal device of claim 1, wherein the grip unit further comprises a fingerprint recognition sensor, and
    wherein, in case a fingerprint being inputted to the fingerprint recognition sensor matches with a predetermined fingerprint, the controller cancels primary security settings.

16. The terminal device of claim 15, wherein, when the primary security settings are cancelled, in case a signature is recognized based upon a signal detected by the sensor unit in accordance with a movement of the terminal device, and in case the recognized signature matches with a predetermined signature, the controller cancels secondary security settings.

17. The terminal device of claim 16, wherein the controller controls the sub display unit so as to display the recognized signature for a predetermined period of time or more.

18. The terminal device of claim 1, wherein the grip unit further comprises a fingerprint recognition sensor,
  wherein, when an authentication screen is displayed on the rollable display unit in the first mode, in case the rollable display unit is stored in the housing, and, in case a contact state detected by the grip unit matches with a predetermined contact state, the controller sets up a second mode, and
  wherein, in case a fingerprint inputted through the fingerprint recognition sensor matches with a predetermined fingerprint, and in case a signature is recognized based upon a signal detected by the sensor unit in accordance with a movement of the terminal device, and in case a recognized signature matches with a predetermined signature, the controller executes authentication.

19. The terminal device of claim 18, wherein, in case the inputted fingerprint does not match with the predetermined fingerprint, or in case the recognized signature does not match with the predetermined signature, the controller outputs a notification signal.

\* \* \* \* \*